US012598168B2

(12) United States Patent
Wang et al.

(10) Patent No.: US 12,598,168 B2
(45) Date of Patent: Apr. 7, 2026

(54) SYSTEM, METHOD, AND APPARATUS FOR SECURELY SHARING AUDIO-VIDEO DATA BASED ON FULL ANONYMOUS PRIVACY COMPUTATION

(71) Applicant: Hangzhou Hikvision Digital Technology Co., Ltd., Hangzhou (CN)

(72) Inventors: Bin Wang, Hangzhou (CN); Da Chen, Hangzhou (CN); Kezhang Lin, Hangzhou (CN); Jiadong Chen, Hangzhou (CN); Xing Wang, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 0 days.

(21) Appl. No.: 19/240,349

(22) Filed: Jun. 17, 2025

(65) Prior Publication Data

US 2026/0089145 A1      Mar. 26, 2026

(30) Foreign Application Priority Data

Sep. 20, 2024    (CN) .......................... 202411330442.2

(51) Int. Cl.
*H04L 29/06*          (2006.01)
*H04L 9/40*           (2022.01)
(52) U.S. Cl.
CPC ................................ *H04L 63/0485* (2013.01)
(58) Field of Classification Search
CPC .................................................. H04L 63/0485
(Continued)

(56) References Cited

U.S. PATENT DOCUMENTS

2016/0293184 A1    10/2016  Li et al.
2020/0311307 A1*   10/2020  Levy ................... G06F 21/6245
(Continued)

FOREIGN PATENT DOCUMENTS

CN        113407996 A      9/2021
CN        114567511 A      5/2022
(Continued)

OTHER PUBLICATIONS

Maqour, "Preserving Privacy in Mobile Crowdsensing within Intelligent Transportation System: Current Research and Future Challenges", 2023, IWCMC, pp. 1-6 (Year: 2023).*
(Continued)

*Primary Examiner* — Taghi T Arani
*Assistant Examiner* — Gregory A Lane
(74) *Attorney, Agent, or Firm* — Meunier Carlin & Curfman LLC

(57)          ABSTRACT

Method, system and apparatus for securely sharing audio-video data based on full anonymous privacy. The system encapsulates the original audio-video data and uses an obfuscation algorithm to protect service information, such that the requirements of audio-video data sharing are met, and the privacy of data is increased; meanwhile, determines shareable audio-video data by calculating the intersection of the obfuscation sets, such that the accuracy of data access is ensured. In addition, the system further uses an encryption algorithm to protect an identity and permission of a recipient, categorizing information and grading information, only sends data that the data recipient has permission for, improving security and reducing system resources. The system the requirements of audio-video data sharing and protects the privacy and security of the audio-video data, prevents the leakage of sensitive information, and thus improves the security of audio-video data sharing.

15 Claims, 7 Drawing Sheets

(58) Field of Classification Search
USPC ......................................................... 713/153
See application file for complete search history.

(56) References Cited

U.S. PATENT DOCUMENTS

| | | | | |
|---|---|---|---|---|
| 2021/0256421 | A1* | 8/2021 | Sundaresan | ............ G06N 20/00 |
| 2022/0345450 | A1* | 10/2022 | Hu | ...................... H04L 63/0492 |
| 2024/0015207 | A1* | 1/2024 | Kim | ........................ H04L 67/52 |
| 2024/0338433 | A1* | 10/2024 | Nonaka | ................... G06F 9/542 |

FOREIGN PATENT DOCUMENTS

| | | |
|---|---|---|
| CN | 116614599 A | 8/2023 |
| WO | 2022261244 A1 | 12/2022 |

OTHER PUBLICATIONS

Liu, "Enabling Efficient and Distributed Access Control for Pervasive Edge Computing Services", 2024, IEEE, pp. 11342-11354 (Year: 2024).*

\* cited by examiner

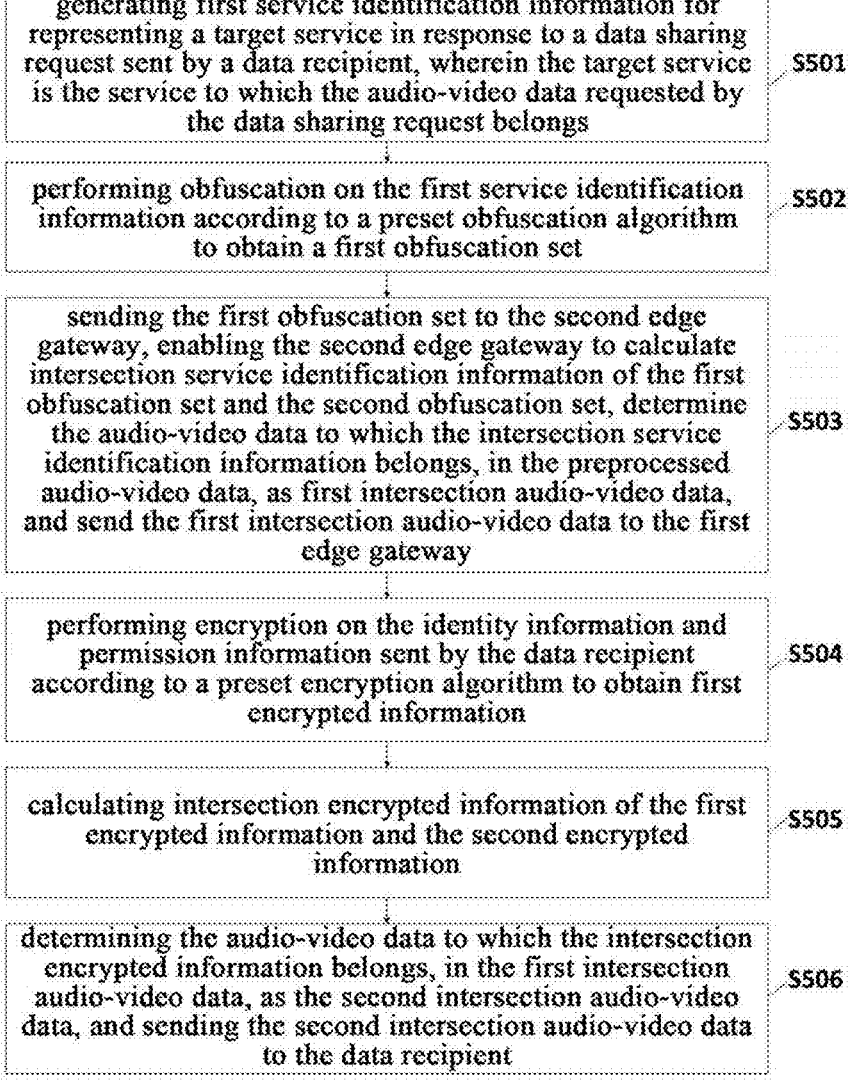

generating first service identification information for representing a target service in response to a data sharing request sent by a data recipient, wherein the target service is the service to which the audio-video data requested by the data sharing request belongs ⟋ S501 performing obfuscation on the first service identification information according to a preset obfuscation algorithm to obtain a first obfuscation set ⟋ S502 sending the first obfuscation set to the second edge gateway, enabling the second edge gateway to calculate intersection service identification information of the first obfuscation set and the second obfuscation set, determine the audio-video data to which the intersection service identification information belongs, in the preprocessed audio-video data, as first intersection audio-video data, and send the first intersection audio-video data to the first edge gateway ⟋ S503 performing encryption on the identity information and permission information sent by the data recipient according to a preset encryption algorithm to obtain first encrypted information ⟋ S504 calculating intersection encrypted information of the first encrypted information and the second encrypted information ⟋ S505 determining the audio-video data to which the intersection encrypted information belongs, in the first intersection audio-video data, as the second intersection audio-video data, and sending the second intersection audio-video data to the data recipient ⟋ S506

Fig. 5

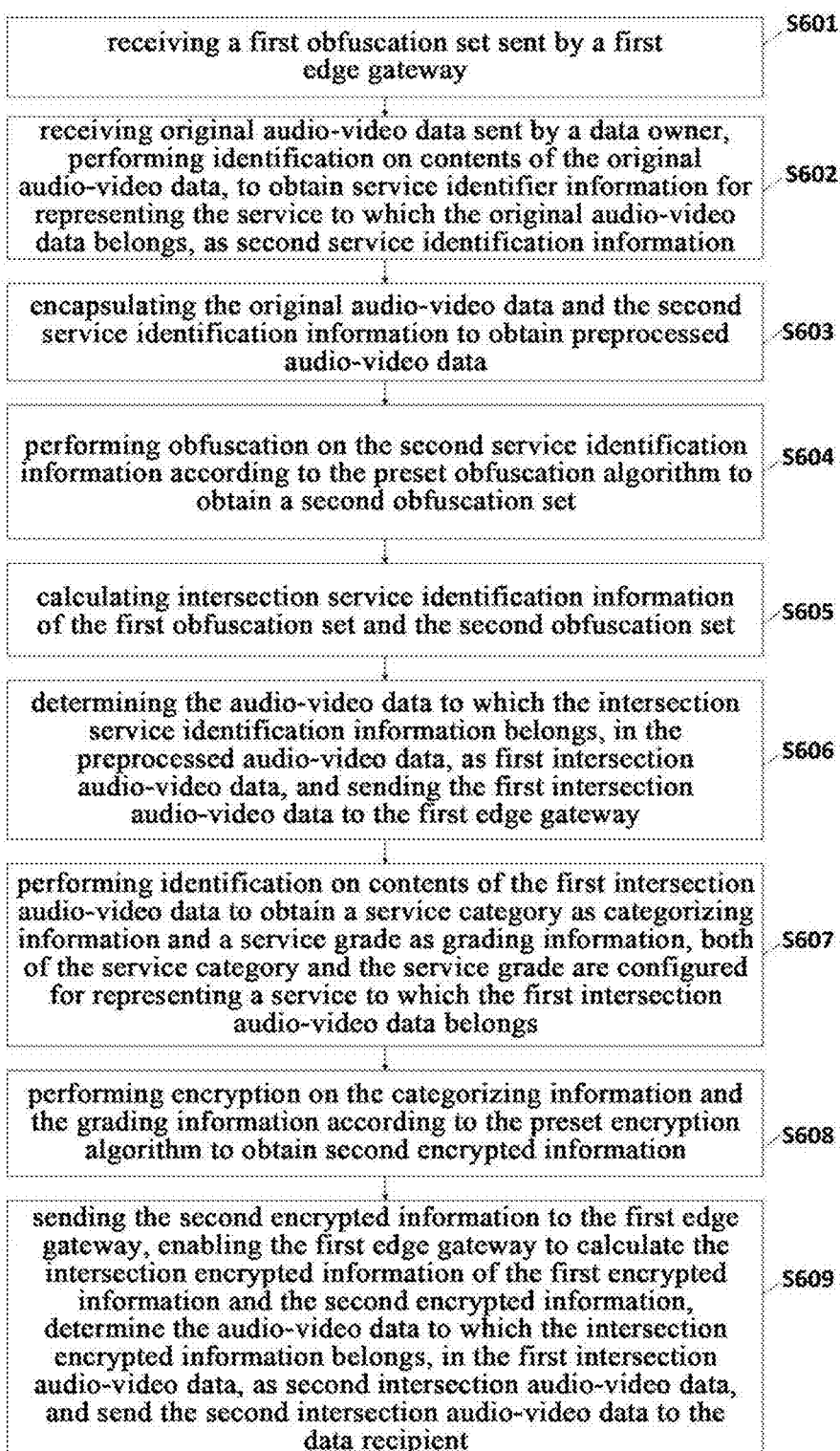

receiving a first obfuscation set sent by a first edge gateway — S601 receiving original audio-video data sent by a data owner, performing identification on contents of the original audio-video data, to obtain service identifier information for representing the service to which the original audio-video data belongs, as second service identification information — S602 encapsulating the original audio-video data and the second service identification information to obtain preprocessed audio-video data — S603 performing obfuscation on the second service identification information according to the preset obfuscation algorithm to obtain a second obfuscation set — S604 calculating intersection service identification information of the first obfuscation set and the second obfuscation set — S605 determining the audio-video data to which the intersection service identification information belongs, in the preprocessed audio-video data, as first intersection audio-video data, and sending the first intersection audio-video data to the first edge gateway — S606 performing identification on contents of the first intersection audio-video data to obtain a service category as categorizing information and a service grade as grading information, both of the service category and the service grade are configured for representing a service to which the first intersection audio-video data belongs — S607 performing encryption on the categorizing information and the grading information according to the preset encryption algorithm to obtain second encrypted information — S608 sending the second encrypted information to the first edge gateway, enabling the first edge gateway to calculate the intersection encrypted information of the first encrypted information and the second encrypted information, determine the audio-video data to which the intersection encrypted information belongs, in the first intersection audio-video data, as second intersection audio-video data, and send the second intersection audio-video data to the data recipient — S609

Fig. 6

SYSTEM, METHOD, AND APPARATUS FOR SECURELY SHARING AUDIO-VIDEO DATA BASED ON FULL ANONYMOUS PRIVACY COMPUTATION

CROSS-REFERENCE TO RELATED APPLICATION

The present application claims the priority to a Chinese patent application 202411330442.2 filed with the China National Intellectual Property Administration (CNIPA) on Sep. 20, 2024 and entitled "SYSTEM, METHOD, AND APPARATUS FOR SECURELY SHARING AUDIO-VIDEO DATA BASED ON FULL ANONYMOUS PRIVACY COMPUTATION", which is incorporated herein by reference in its entirety.

TECHNICAL FIELD

The present application relates to the technical field of data security, in particular to a system, method, and apparatus for securely sharing audio-video data based on full anonymous privacy computation.

BACKGROUND

In smart cities, Internet of Things devices such as cameras and sensors are deployed on a large scale, which can collect and transmit large amounts of data in real time. City managers can perform monitoring and analysis according to the data. For example, the transportation department analyzes road congestion situation through the data collected by cameras and sensors, while the investment department utilizes the data to evaluate pedestrian flow in commercial districts, and to provide scientific basis for urban planning and policy-making.

However, while enjoying the convenience brought by the Internet of Things technology, it is also necessary to face up to the security risks the Internet of Things technology brings, especially the privacy leakage problem in a process of cross-domain sharing of audio-video data. The audio-video data contains a large amount of personal privacy information, such as facial images, phone numbers, etc. Once these data are leaked or abused, it may bring a series of adverse effects. Therefore, how to effectively prevent privacy leakage during the process of sharing audio-video data has become an urgent technical problem that needs to be solved.

SUMMARY

The purpose of embodiments of the present application is to provide a system, method, and apparatus for securely sharing audio-video data based on full anonymous privacy computation, in order to improve the security of audio-video data sharing. The specific technical solutions are as follows.

In a first aspect, an embodiment of the present application provides a system for securely sharing audio-video data based on full anonymous privacy computation, the system includes a first edge gateway and a second edge gateway; the first edge gateway is configured for generating first service identification information for representing a target service in response to a data sharing request sent by a data recipient, wherein the target service is a service to which audio-video data requested by the data sharing request belongs; performing obfuscation on the first service identification information according to a preset obfuscation algorithm to obtain a first obfuscation set; sending the first obfuscation set to the second edge gateway;

the second edge gateway is configured for receiving original audio-video data sent by a data owner, performing identification on contents of the original audio-video data to obtain service identification information for representing a service to which the original audio-video data belongs, as second service identification information; encapsulating the original audio-video data and the second service identification information to obtain preprocessed audio-video data; performing obfuscation on the second service identification information according to the preset obfuscation algorithm to obtain a second obfuscation set; calculating intersection service identification information of the first obfuscation set and the second obfuscation set; determining audio-video data to which the intersection service identification information belongs, in the preprocessed audio-video data, as first intersection audio-video data, and sending the first intersection audio-video data to the first edge gateway;

the first edge gateway is further configured for performing encryption on identity information and permission information sent by the data recipient according to a preset encryption algorithm to obtain first encrypted information;

the second edge gateway is further configured for performing identification on contents of the first intersection audio-video data, to obtain a service category for representing a service to which the first intersection audio-video data belongs as categorizing information and a service grade for representing the service to which the first intersection audio-video data belongs as grading information; performing encryption on the categorizing information and the grading information according to the preset encryption algorithm to obtain second encrypted information; sending the second encrypted information to the first edge gateway;

the first edge gateway is further configured for calculating intersection encrypted information of the first encrypted information and the second encrypted information; determining audio-video data to which the intersection encrypted information belongs, in the first intersection audio-video data, as second intersection audio-video data, and sending the second intersection audio-video data to the data recipient.

In one possible implementation, the first edge gateway is further configured for generating first attribute information for representing an attribute of a target object in response to the data sharing request sent by the data recipient, wherein the target object is an object to which the audio-video data requested by the data sharing request belongs; performing obfuscation on the first attribute information according to the preset obfuscation algorithm to obtain a third obfuscation set; sending the third obfuscation set to the second edge gateway;

the second edge gateway is further configured for performing identification on the contents of the original audio-video data, to obtain attribute information for representing an attribute of each object in the original audio-video data as second attribute information; performing obfuscation on the second attribute information according to the preset obfuscation algorithm to obtain a fourth obfuscation set; calculating intersection attribute information of the third obfuscation set and the fourth obfuscation set;

determining the audio-video data to which the intersection service identification information belongs, in the pre-processed audio-video data, as the first intersection audio-video data, includes:

determining audio-video data to which both the intersection service identification information and the intersection attribute information belong, in the preprocessed audio-video data, as the first intersection audio-video data.

In one possible implementation, the second edge gateway is further configured for acquiring an original packet format of the original audio-video data, performing security detection on the original packet format, and determining original audio-video data to which original packet format passing the security detection belongs, as audio-video data to be shared;

encapsulating the original audio-video data and the second service identification information obtained according to the original audio-video data to obtain the preprocessed audio-video data, includes:

encapsulating the audio-video data to be shared and the second service identification information obtained according to the audio-video data to be shared to obtain the preprocessed audio-video data.

In one possible implementation, the system further includes a platform-side device;

the platform-side device is configured for generating pre-request data based on a data request, and performing obfuscation on the pre-request data according to the preset obfuscation algorithm to obtain a fifth obfuscation set, wherein, the data request is used to request historical data of an edge gateway; sending the fifth obfuscation set to the edge gateway;

the edge gateway is configured for acquiring the historical data and performing obfuscation on the historical data according to the preset obfuscation algorithm to obtain a sixth obfuscation set; calculating intersection historical data of the fifth obfuscation set and the sixth obfuscation set, performing encryption on the intersection historical data to obtain encrypted historical data; sending the encrypted historical data to the platform-side device;

the platform-side device is further configured for performing training by using the encrypted historical data to obtain a target data sharing model, and deploying the target data sharing model to the edge gateway;

the obfuscation is performed on information in a manner comprising:

inputting information on which obfuscation needs to be performed into the target data sharing model for obfuscation.

In a second aspect, an embodiment of the present application provides a method for securely sharing audio-video data based on full anonymous privacy computation, applied to a first edge gateway, the method includes:

generating first service identification information for representing a target service in response to a data sharing request sent by a data recipient, wherein the target service is a service to which audio-video data requested by the data sharing request belongs;

performing obfuscation on the first service identification information according to a preset obfuscation algorithm to obtain a first obfuscation set;

sending the first obfuscation set to a second edge gateway, enabling the second edge gateway to calculate intersection service identification information of the first obfuscation set and the second obfuscation set, determine audio-video data to which the intersection service identification information belongs, in preprocessed audio-video data, as first intersection audio-video data, and send the first intersection audio-video data to the first edge gateway, wherein, the second obfuscation set is obtained by the second edge gateway performing obfuscation on second service identification information according to the preset obfuscation algorithm, the second service identification information is service identification information for representing a service to which original audio-video data belongs, which is obtained by the second edge gateway performing identification contents of the original audio-video data, the original audio-video data is sent by a data owner to the second edge gateway, and the preprocessed audio-video data is obtained by the second edge gateway encapsulating the original audio-video data and the second service identification information;

performing encryption on identity information and permission information sent by the data recipient according to a preset encryption algorithm to obtain first encrypted information;

calculating intersection encrypted information of the first encrypted information and the second encrypted information, wherein, the second encrypted information is obtained by the second edge gateway performing encryption on categorizing information and grading information according to the preset encryption algorithm, and the categorizing information is information of a service category for representing a service to which the first intersection audio-video data belongs and the grading information is information of a service grade for representing the service to which the first intersection audio-video data belongs, which both are obtained by the second edge gateway performing identification on contents of the first intersection audio-video data;

determining audio-video data to which the intersection encrypted information belongs, in the first intersection audio-video data, as second intersection audio-video data, and sending the second intersection audio-video data to the data recipient.

In one possible implementation, the method further includes:

generating first attribute information for representing an attribute of a target object in response to the data sharing request sent by the data recipient, wherein the target object is an object to which the audio-video data requested by the data sharing request belongs;

performing obfuscation on the first attribute information according to the preset obfuscation algorithm to obtain a third obfuscation set;

sending the third obfuscation set to the second edge gateway, enabling the second edge gateway to calculate intersection attribute information of the third obfuscation set and the fourth obfuscation set, wherein, the fourth obfuscation set is obtained by the second edge gateway performing obfuscation on second attribute information according to the preset obfuscation algorithm, and the second attribute information is attribute information for representing an attribute of each object in the original audio-video data, which is obtained by the second edge gateway performing identification on the contents of the original audio-video data;

determining the audio-video data to which the intersection service identification information belongs, in the pre-processed audio-video data, as the first intersection audio-video data, includes:

determining audio-video data to which both the intersection service identification information and the intersection attribute information belong, in the preprocessed audio-video data, as the first intersection audio-video data.

In a third aspect, an embodiment of the present application provides a method for securely sharing audio-video data based on full anonymous privacy computation, applied to a second edge gateway, the method includes:

receiving a first obfuscation set sent by a first edge gateway, wherein, the first obfuscation set is obtained by the first edge gateway performing obfuscation on first service identification information according to a preset obfuscation algorithm, the first service identification information is service identification information for representing a target service, which is generated by the first edge gateway in response to a data sharing request sent by a data recipient, the target service is a service to which audio-video data requested by the data sharing request belongs;

receiving original audio-video data sent by a data owner, performing identification on contents of the original audio-video data to obtain service identification information for representing a service to which the original audio-video data belongs, as second service identification information;

encapsulating the original audio-video data and the second service identification information to obtain preprocessed audio-video data;

performing obfuscation on the second service identification information according to the preset obfuscation algorithm to obtain a second obfuscation set;

calculating intersection service identification information of the first obfuscation set and the second obfuscation set;

determining audio-video data to which the intersection service identification information belongs, in the preprocessed audio-video data, as first intersection audio-video data, and sending the first intersection audio-video data to the first edge gateway;

performing identification on contents of the first intersection audio-video data, to obtain a service category for representing a service to which the first intersection audio-video data belongs as categorizing information and a service grade for representing the service to which the first intersection audio-video data belongs as grading information;

performing encryption on the categorizing information and the grading information according to the preset encryption algorithm to obtain second encrypted information;

sending the second encrypted information to the first edge gateway, enabling the first edge gateway to calculate intersection encrypted information of first encrypted information and the second encrypted information, determine audio-video data to which the intersection encrypted information belongs, in the first intersection audio-video data, as second intersection audio-video data, and send the second intersection audio-video data to the data recipient, wherein, the first encrypted information is obtained by the first edge gateway performing encryption on identity information and permission information sent by the data recipient according to the preset encryption algorithm.

In one possible implementation, the method further includes:

receiving a third obfuscation set sent by the first edge gateway, wherein, the third obfuscation set is obtained by the first edge gateway performing obfuscation on first attribute information according to the preset obfuscation algorithm, the first attribute information is attribute information for representing an attribute of a target object, which is generated by the first edge gateway in response to the data sharing request sent by the data recipient, the target object is an object to which the audio-video data requested by the data sharing request belongs;

performing identification on the contents of the original audio-video data, to obtain attribute information for representing an attribute of each object in the original audio-video data as second attribute information;

performing obfuscation on the second attribute information according to the preset obfuscation algorithm to obtain a fourth obfuscation set;

calculating intersection attribute information of the third obfuscation set and the fourth obfuscation set;

determining the audio-video data to which the intersection service identification information belongs, in the preprocessed audio-video data, as the first intersection audio-video data, includes:

determining audio-video data to which both the intersection service identification information and the intersection attribute information belong, in the preprocessed audio-video data, as the first intersection audio-video data.

In one possible implementation, the method further includes:

acquiring an original packet format of the original audio-video data, performing security detection on the original packet format, and determining original audio-video data to which original packet format passing the security detection belongs, as audio-video data to be shared;

encapsulating the original audio-video data and the second service identification information, obtained according to the original audio-video data, to obtain the preprocessed audio-video data, comprises:

encapsulating the audio-video data to be shared and the second service identification information obtained according to the audio-video data to be shared to obtain the preprocessed audio-video data.

In a fourth aspect, an embodiment of the present application provides an apparatus for securely sharing audio-video data based on full anonymous privacy computation, applied to a first edge gateway, the apparatus includes:

a first generation module, configured for generating first service identification information for representing a target service in response to a data sharing request sent by a data recipient, wherein the target service is a service to which audio-video data requested by the data sharing request belongs;

a first obfuscation module, configured for performing obfuscation on the first service identification information according to a preset obfuscation algorithm to obtain a first obfuscation set;

a first sending module, configured for sending the first obfuscation set to a second edge gateway, enabling the second edge gateway to calculate intersection service identification information of the first obfuscation set and the second obfuscation set, determine audio-video data to which the intersection service identification information belongs, in preprocessed audio-video data, as first intersection audio-video data, and send the first intersection audio-video data to the first edge gateway, wherein, the second obfuscation set is obtained by the second edge gateway performing obfuscation on second service identification information according to the preset obfuscation algorithm, the second service identification information is service identification information for representing a service to which original audio-video data belongs, which is obtained by the second edge gateway performing identification on contents of the original audio-video data, the original audio-video data is sent by a data owner to the second edge gateway, and the preprocessed audio-video data is obtained by the second edge gateway encapsulating the original audio-video data and the second service identification information;

a first encryption module, configured for performing encryption on identity information and permission information sent by the data recipient according to a preset encryption algorithm to obtain first encrypted information;

a first calculation module, configured for calculating intersection encrypted information of the first encrypted information and the second encrypted information, wherein, the second encrypted information is obtained by the second edge gateway performing encryption on categorizing information and grading information according to the preset encryption algorithm, and the categorizing information is information of a service category for representing a service to which the first intersection audio-video data belongs and the grading information is information of a service grade for representing the service to which the first intersection audio-video data belongs, which both are obtained by the second edge gateway performing identification on contents of the first intersection audio-video data;

a second sending module, configured for determining audio-video data to which the intersection encrypted information belongs, in the first intersection audio-video data, as second intersection audio-video data, and sending the second intersection audio-video data to the data recipient.

In one possible implementation, the apparatus further includes:

a fourth generation module, configured for generating first attribute information for representing an attribute of a target object in response to the data sharing request sent by the data recipient, wherein the target object is an object to which the audio-video data requested by the data sharing request belongs;

a third obfuscation module, configured for performing obfuscation on the first attribute information according to the preset obfuscation algorithm to obtain a third obfuscation set;

a fourth sending module, configured for sending the third obfuscation set to the second edge gateway, enabling the second edge gateway to calculate intersection attribute information of the third obfuscation set and the fourth obfuscation set, wherein, the fourth obfuscation set is obtained by the second edge gateway performing obfuscation on the second attribute information according to the preset obfuscation algorithm, and the second attribute information is attribute information for representing an attribute of each object in the original audio-video data, which is obtained by the second edge gateway performing identification on contents of the original audio-video data;

the first sending module includes:

a first sending submodule, configured for determining audio-video data to which both the intersection service identification information and the intersection attribute information belong, in the preprocessed audio-video data, as the first intersection audio-video data.

In a fifth aspect, an embodiment of the present application provides an apparatus for securely sharing audio-video data based on full anonymous privacy computation, applied to a second edge gateway, the apparatus includes:

a first receiving module, configured for receiving a first obfuscation set sent by a first edge gateway, wherein, the first obfuscation set is obtained by the first edge gateway performing obfuscation on first service identification information according to a preset obfuscation algorithm, the first service identification information is service identification information for representing a target service, which is generated by the first edge gateway in response to a data sharing request sent by a data recipient, the target service is a service to which audio-video data requested by the data sharing request belongs;

a second generation module, configured for receiving original audio-video data sent by a data owner, performing identification on contents of the original audio-video data to obtain service identification information for representing a service to which the original audio-video data belongs, as second service identification information;

a first encapsulation module, configured for encapsulating the original audio-video data and the second service identification information to obtain preprocessed audio-video data;

a second obfuscation module, configured for performing obfuscation on the second service identification information according to the preset obfuscation algorithm to obtain a second obfuscation set;

a second calculation module, configured for calculating intersection service identification information of the first obfuscation set and the second obfuscation set;

a first determination module, configured for determining audio-video data to which the intersection service identification information belongs, in the preprocessed audio-video data, as first intersection audio-video data, and sending the first intersection audio-video data to the first edge gateway;

a third generation module, configured for performing identification on contents of the first intersection audio-video data, to obtain a service category for representing a service to which the first intersection audio-video data belongs as categorizing information and a service grade for representing the service to which the first intersection audio-video data belongs as grading information;

a second encryption module, configured for performing encryption on the categorizing information and the grading information according to the preset encryption algorithm to obtain second encrypted information;

a third sending module, configured for sending the second encrypted information to the first edge gateway, enabling the first edge gateway to calculate intersection encrypted information of first encrypted information and the second encrypted information, determine audio-video data to which the intersection encrypted information belongs, in the first intersection audio-video data, as second intersection audio-video data, and send the second intersection audio-video data to the data recipient, wherein, the first encrypted information is obtained by the first edge gateway performing encryption on identity information and permission information sent by the data recipient according to the preset encryption algorithm.

In one possible implementation, the apparatus further includes:

a second receiving module, configured for receiving a third obfuscation set sent by the first edge gateway, wherein, the third obfuscation set is obtained by the first edge gateway performing obfuscation on first attribute information according to the preset obfuscation algorithm, the first attribute information is attribute information for representing an attribute of a target object, which is generated by the first edge gateway in response to the data sharing request sent by the data recipient, the target object is an object to which the audio-video data requested by the data sharing request belongs;

a fifth generation module, configured for performing identification on contents of the original audio-video data, to obtain attribute information for representing an attribute of each object in the original audio-video data as second attribute information;

a fourth obfuscation module, configured for performing obfuscation on the second attribute information according to the preset obfuscation algorithm to obtain a fourth obfuscation set;

a third calculation module, configured for calculating intersection attribute information of the third obfuscation set and the fourth obfuscation set;

the first determination module includes:

a first determination submodule, configured for determining audio-video data to which both the intersection service identification information and the intersection attribute information belong, in the preprocessed audio-video data, as first intersection audio-video data.

In one possible implementation, the apparatus further includes:

a first detection module, configured for acquiring an original packet format of the original audio-video data, performing security detection on the original packet format, and determining the original audio-video data to which the original packet format that passes the security detection belongs, as audio-video data to be shared;

the first encapsulation module includes:

a first encapsulation submodule, configured for encapsulating the audio-video data to be shared and the second attribute information obtained according to the audio-video data to be shared to obtain the preprocessed audio-video data.

In a sixth aspect, an embodiment of the present application provides an electronic device including:

a memory, configured for storing a computer program;

a processor, configured for implementing any one of the above method for securely sharing audio-video data based on full anonymous privacy computation applied to the first edge gateway or the method for securely sharing audio-video data based on full anonymous privacy computation applied to the second edge gateway when executing the program stored in the memory.

In a seventh aspect, an embodiment of the present application provides a computer-readable storage medium stores a computer program therein, which when executed by a processor, causes the processor to implement any one of the above method for securely sharing audio-video data based on full anonymous privacy computation applied to the first edge gateway or the method for securely sharing audio-video data based on full anonymous privacy computation applied to the second edge gateway.

In an eighth aspect, an embodiment of the present application further provides a computer program product containing instructions, which when running on a computer, cause the computer to carry out any one of the above method for securely sharing audio-video data based on full anonymous privacy computation applied to the first edge gateway or the method for securely sharing audio-video data based on full anonymous privacy computation applied to the second edge gateway.

Beneficial effects of the embodiments of the present application are as follows:

The system, method, and apparatus for securely sharing audio-video data based on full anonymous privacy computation provided by the embodiments of the present application achieve high privacy protection and precise access control of the sharing process of audio-video data by introducing a cooperation mechanism of the first edge gateway and the second edge gateway. The system encapsulates the original audio-video data to obtain structured audio-video data, and performs obfuscation on the service identification information according to the preset obfuscation algorithm, such that the requirements of audio-video data sharing are met, direct exposure of the service information is effectively avoided, and the privacy and security of the audio-video data are increased; meanwhile, determines shareable audio-video data by calculating the intersection of the obfuscation sets, such that the accuracy of data access is ensured. In addition, a preset encryption algorithm is used to perform encryption on the identity information and permission information of the data recipient, as well as the categorizing information and grading information of the audio-video data. Only audio-video data that the data recipient has access permission for, is sent to the data recipient, such that not only the resource occupation of the system for securely sharing audio-video data is reduced, but also the pertinence and security of audio-video data transmission is improved. Finally, under the premise of ensuring data privacy, the system not only meets the requirements of audio-video data sharing, but also effectively protects the privacy and security of the audio-video data, prevents the leakage of sensitive information, and thus improves the security of audio-video data sharing, achieves a secure audio-video data sharing mechanism.

Of course, it is not necessary for any product or method implementing the present application to achieve all the advantages described above simultaneously.

BRIEF DESCRIPTION OF THE DRAWINGS

In order to more clearly explain the technical solutions in the embodiments of the present application or the prior art, the accompanying drawings that need to be used in the embodiments or the prior art will be briefly described below. Obviously, the accompanying drawings described below are for only some of the embodiments of the present application. For those skilled in the art, they may also obtain other embodiments based on these accompanying drawings.

FIG. 5 is a fourth schematic flow chart of a method for securely sharing audio-video data based on full anonymous privacy computation provided by an embodiment of the present application;

FIG. 6 is a fifth schematic flow chart of a method for securely sharing audio-video data based on full anonymous privacy computation provided by an embodiment of the present application;

DETAILED DESCRIPTION

Figure 1:
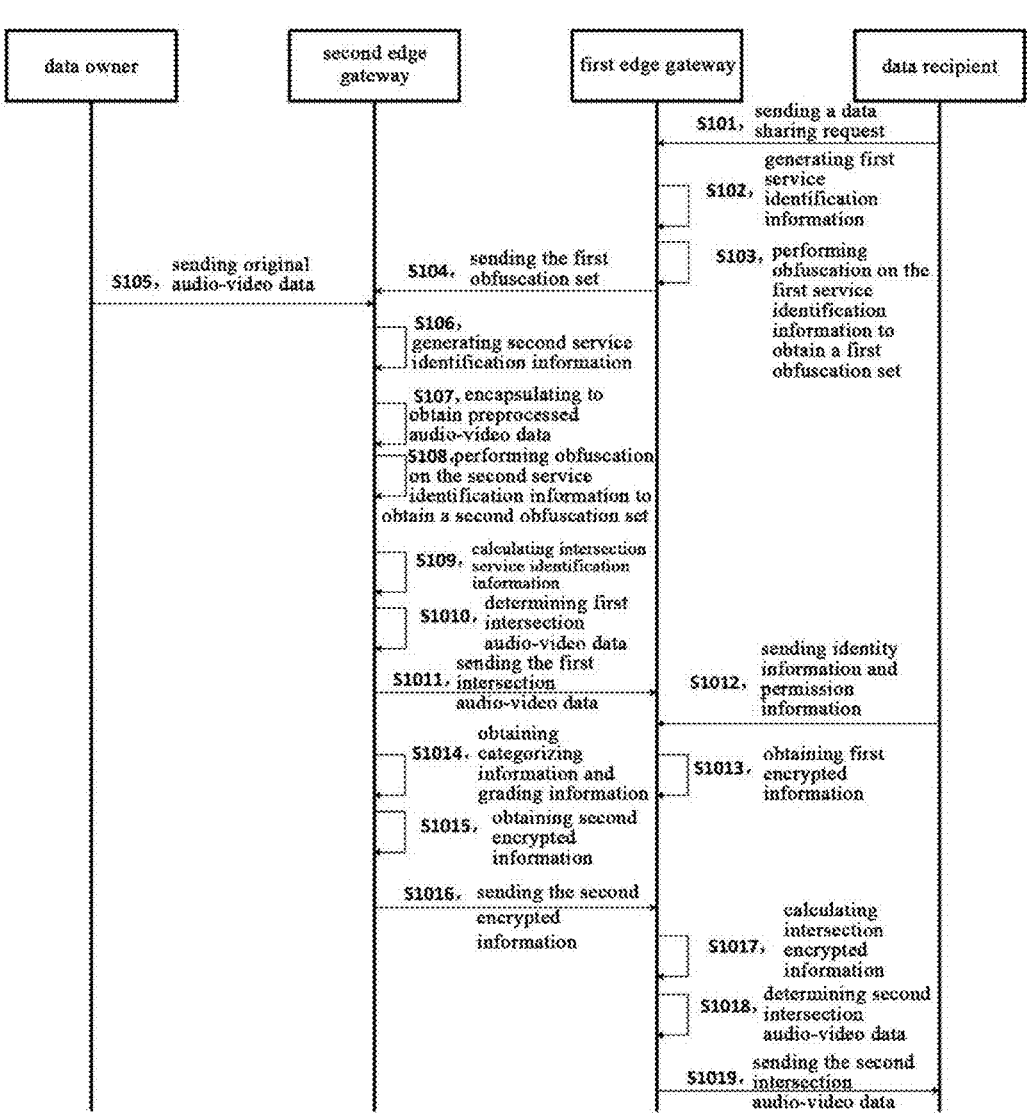
FIG. 1 is a first schematic flow chart of a method for securely sharing audio-video data based on full anonymous privacy computation provided by an embodiment of the present application.

The technical solutions in the embodiments of the present application will be clearly and completely described below with reference to the accompanying drawings in the embodiments of the present application. Obviously, the described embodiments are only some, and not all, of the embodiments of the present application. All other embodiments obtained based on the embodiments of the present application those skilled in the art fall into the scope of protection of the present application.

An embodiment of the present application provides a system for securely sharing audio-video data based on full anonymous privacy computation, including a first edge gateway and a second edge gateway.

The first edge gateway is configured for generating first service identification information for representing a target service in response to a data sharing request sent by a data recipient, wherein the target service is a service to which audio-video data requested by the data sharing request belongs; performing obfuscation on the first service identification information according to a preset obfuscation algorithm to obtain a first obfuscation set; sending the first obfuscation set to the second edge gateway.

The second edge gateway is configured for receiving original audio-video data sent by a data owner, performing identification on contents of the original audio-video data to obtain service identification information for representing a service to which the original audio-video data belongs, as second service identification information; encapsulating the original audio-video data and the second service identification information to obtain preprocessed audio-video data; performing obfuscation on the second service identification information according to the preset obfuscation algorithm to obtain a second obfuscation set; calculating intersection service identification information of the first obfuscation set and the second obfuscation set; determining audio-video data to which the intersection service identification information belongs, in the preprocessed audio-video data, as first intersection audio-video data, and sending the first intersection audio-video data to the first edge gateway.

The first edge gateway is further configured for performing encryption on identity information and permission information sent by the data recipient according to a preset encryption algorithm to obtain first encrypted information.

The second edge gateway is further configured for performing identification on contents of the first intersection audio-video data, to obtain a service category as categorizing information and a service grade as grading information, both of which are configured for representing a service to which the first intersection audio-video data belongs; performing encryption on the categorizing information and the grading information according to the preset encryption algorithm to obtain second encrypted information; sending the second encrypted information to the first edge gateway.

The first edge gateway is further configured for calculating intersection encrypted information of the first encrypted information and the second encrypted information; determining audio-video data to which the intersection encrypted information belongs, in the first intersection audio-video data, as second intersection audio-video data, and sending the second intersection audio-video data to the data recipient.

By applying the above embodiment, high privacy protection and precise access control of the sharing process of audio-video data have been achieved by introducing a cooperation mechanism of the first edge gateway and the second edge gateway. The system encapsulates the original audio-video data to obtain structured audio-video data, and performs obfuscation on the service identification information according to the preset obfuscation algorithm, such that the requirements of audio-video data sharing are met, direct exposure of the service information is effectively avoided, and the privacy and security of the audio-video data are increased; meanwhile, determines shareable audio-video data by calculating the intersection of the obfuscation sets, such that the accuracy of data access is ensured. In addition, a preset encryption algorithm is used to perform encryption on the identity information and permission information of the data recipient, as well as the categorizing information and grading information of the audio-video data, and only audio-video data that the data recipient has access permission for, is sent to the data recipient, such that not only the resource occupation of the system for securely sharing audio-video data is reduced, but also the pertinence and security of audio-video data transmission is improved. Finally, under the premise of ensuring data privacy, the system not only meets the requirements of audio-video data sharing, but also effectively protects the privacy and security of the audio-video data, prevents the leakage of sensitive information, and thus improves the security of audio-video data sharing, achieves a secure sharing mechanism for audio-video data.

In order to more clearly describe the mechanism about how the system for securely sharing audio-video data provided in the present application implement a secure audio-video data sharing, a process of sharing audio-video data by the system for securely sharing audio-video data may be shown in FIG. 1, which is a first schematic flow chart of a method for securely sharing audio-video data based on full anonymous privacy computation provided by an embodiment of the present application, including:

S101, a first edge gateway responds to a data sharing request sent by a data recipient, that is, the data recipient sends the data sharing request to the first edge gateway;

S102, the first edge gateway, in response to the data sharing request sent by the data recipient, generates first service identification information for representing a target service, wherein the target service is a service to which audio-video data requested by the data sharing request belongs;

S103, the first edge gateway performs obfuscation on the first service identification information according to a preset obfuscation algorithm to obtain a first obfuscation set;

S104, the first edge gateway sends the first obfuscation set to a second edge gateway;

S105, the second edge gateway receives original audio-video data sent by a data owner, that is, the data owner sends the original audio-video data to the second edge gateway;

S106, the second edge gateway performs identification on contents of the original audio-video data and generates second service identification information that is service identification information for representing a service to which the original audio-video data belongs;

S107, the second edge gateway encapsulates the original audio-video data and the second service identification information to obtain preprocessed audio-video data;

S108, the second edge gateway performs obfuscation on the second service identification information according to the preset obfuscation algorithm to obtain a second obfuscation set;

S109, the second edge gateway calculates intersection service identification information of the first obfuscation set and the second obfuscation set;

S1010, the second edge gateway determines audio-video data to which the intersection service identification information belongs, in the preprocessed audio-video data, as first intersection audio-video data;

S1011, the second edge gateway sends the first intersection audio-video data obtained by the determination to the first edge gateway;

S1012, the first edge gateway responds to identity information and permission information sent by the data recipient, that is, the data recipient sends the identity information and the permission information to the first edge gateway;

S1013, the first edge gateway performs encryption on the identity information and the permission information according to a preset encryption algorithm to obtain first encrypted information;

S1014, the second edge gateway performs identification on contents of the first intersection audio-video data to obtain a service category as categorizing information and a service grade as grading information, both of the service category and the service grade are configured for representing a service to which the first intersection audio-video data belongs;

S1015, the second edge gateway performs encryption on the categorizing information and the grading information according to the preset encryption algorithm to obtain second encrypted information;

S1016, the second edge gateway sends the second encrypted information to the first edge gateway;

S1017, the first edge gateway calculates intersection encrypted information of the first encrypted information and the second encrypted information;

S1018, the first edge gateway determines audio-video data to which the intersection encrypted information belongs, in the first intersection audio-video data, as second intersection audio-video data;

S1019, the first edge gateway sends the second intersection audio-video data to the data recipient.

The above step S101-step S1019 will be described below:

In order to explain the above process more clearly, one possible application scenario of the system for securely sharing audio-video data provided in the present application will be illustrated below. It may be understood that the following examples are only one possible application scenario of the system for securely sharing audio-video data provided in the present application. In other possible embodiments, the system for securely sharing audio-video data provided in the present application may also be applied to other possible application scenario, the following examples do not limit this in any way.

In the traffic industry, managers need to pay real-time attention to safety conditions of public places. For example, the data recipient needs to analyze congestion of people on various roads according to video recordings obtained from shooting the roads. Areas include roads a, b, c, and d, and the data owner owns the video recordings of the various roads. Assuming that the congestion of people on various road needs to be analyzed for roads a, b, and c, the data recipient needs to request the data owner to share the video recordings obtained from shooting roads a, b, and c.

In step S101 and step S102, the first edge gateway and the second edge gateway are deployed at a boundary crossing network domains or service domains, and exist in the form of independent small router boxes or large servers.

The data recipient requests the required data from the data owner, and the first edge gateway corresponding to the data recipient generates, according to a service to which the audio-video data requested at this time by the data recipient belongs, the first service identification information for representing the service. The service may be traffic monitoring service, violation monitoring service, personnel monitoring service, region monitoring service, etc. Service identification information corresponding to the service may be traffic flow information, violation license plate information, key checkpoint personnel information, confidential region information, etc.

Taking the aforementioned traffic industry as an example, the service is a traffic detection service, and the first service identification information corresponding to the service is abc.

In step S103 and step S104, in order to prevent the leakage of sensitive information and ensure the security of audio-video data sharing, it is necessary to perform obfuscation on the first service identification information for representing the service to which the audio-video data requested by the data requester belongs.

In one possible embodiment, the preset obfuscation algorithm used may be a Hash-based Message Authentication Code (HMAC) algorithm, a key generation method for HMAC operation is PBKDF2 (random number+preset factor), with the number of iterations more than 10000, wherein, the random number is 32-byte random number randomly generated per request, and the preset factor is randomly generated 16 bytes during deployment, securely shared to a secure cryptographic hardware of respective edge gateways, and encrypted by different root keys of the respective edge gateways. After performing obfuscation on the first service identification information by using the HMAC algorithm to obtain the first obfuscation set, the first obfuscation set is sent to the second edge gateway. Taking the aforementioned traffic industry as an example again, assuming that the first obfuscation set (ABC) is obtained by performing obfuscation on the first service identification information (abc) by using the HMAC algorithm, the first edge gateway sends the first obfuscation set (ABC) to the second edge gateway.

In another possible embodiment, the aforementioned system for securely sharing audio-video data further includes a platform-side device. When performing obfuscation on the service identification information, the preset obfuscation algorithm used may be the target data sharing model. Specifically, the first edge gateway inputs the first service identification information into the target data sharing model to obtain the first obfuscation set, and the second edge gateway inputs the second service identification information into the target data sharing model to obtain the second obfuscation set.

Figure 2:
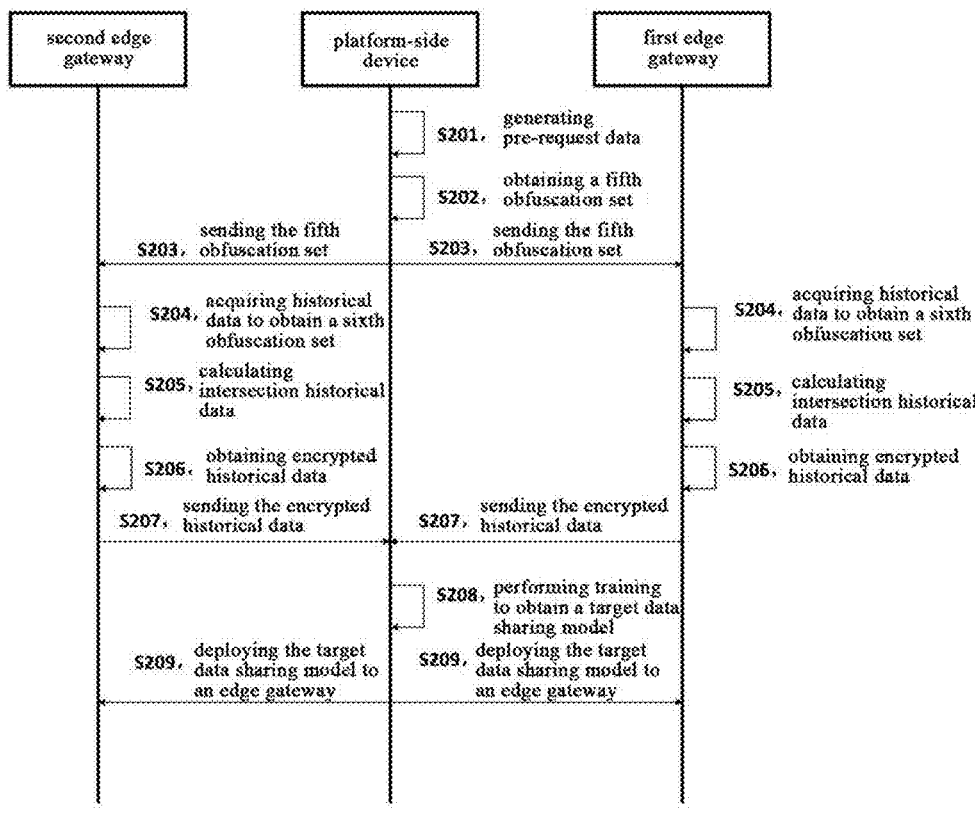
FIG. 2 is a schematic flow chart of training of a target data sharing model provided by an embodiment of the present application.

The following will describe how the platform-side device performs to obtain the target data sharing model, referring to FIG. 2, which is a schematic flow chart of training of the target data sharing model provided by an embodiment of the present application, including:

S201, the platform-side device generates pre-request data based on a data request, wherein, the data request is used to request historical data of an edge gateway, the edge gateway is a first edge gateway, and/or, a second edge gateway;

S202, the platform-side device performs obfuscation on the pre-request data according to a preset obfuscation algorithm to obtain a fifth obfuscation set;

S203, the platform-side device sends the fifth obfuscation set to the edge gateway;

S204, the edge gateway acquires the historical data and performs obfuscation on the historical data according to the preset obfuscation algorithm to obtain a sixth obfuscation set;

S205, the edge gateway calculates intersection historical data of the fifth obfuscation set and the sixth obfuscation set;

S206, the edge gateway performs encryption on the intersection historical data to obtain encrypted historical data;

S207, the edge gateway sends the encrypted historical data to the platform-side device;

S208, the platform-side device performs training by using the encrypted historical data to obtain a target data sharing model;

S209, the platform-side device deploys the target data sharing model to the edge gateway.

The process of training of the target data sharing model is independent of the aforementioned process of securely sharing audio-video data. The platform-side device is configured for training the target data sharing model and updating the algorithm. After the training of the model is completed, the model is deployed to various edge gateways.

In the above steps, the pre-request data generated by the platform-side device according to the data request may include an identifier of the requested data. For example, the historical data of each edge gateway exists in the form of multiple key value pairs (key: XXX, value: XXX) (each key represents a unique identifier, and value represents related data). Each edge gateway obfuscates values corresponding to key fields in the historical data by using the aforementioned HMAC algorithm to generate an obfuscation set. The platform-side device calculates key fields by using the same obfuscation algorithm and matches an obtained obfuscation set with the generated obfuscation set. A successful match indicates that a value of the value field corresponding to the key field belongs to intersection data, while the remaining unmatched data set is deleted or desensitized, that is, the data requested by the platform-side device is filtered out without revealing the type of calculating intersection data.

By applying the above embodiment, the platform-side device generates an obfuscation set based on data requested by its own and sends the obfuscation set to various edge gateways. The edge gateway acquires historical data and obfuscates the historical data, calculates an intersection of the owned historical data and the data requested by the platform-side device, encrypts intersection data and then sends to the platform-side device, which protects effectively privacy of the original audio-video data and reduces the risk of audio-video data leakage. The target data sharing model trained by the platform-side device utilizing encrypted data can effectively share and utilize the audio-video data under the premise of protecting data privacy. Finally, by inputting information that needs obfuscation into the target data sharing model for performing obfuscation, a flexible and efficient data obfuscation method is provided, which helps to promote the sharing of audio-video data while ensuring data privacy, and improves the efficiency of audio-video data sharing.

In one possible embodiment, the data owner may select a preset frequency to periodically send its owned original audio-video data to the second edge gateway. However, a significant limitation of this way is that real-time sharing of audio-video data cannot be ensured, especially in scenarios that require immediate response.

To overcome this limitation, in another possible embodiment, when the first edge gateway sends the first obfuscation set to the second edge gateway, and simultaneously forwards the data sharing request from the data recipient to the second edge gateway, then the second edge gateway forwards the data sharing request to the data owner in real-time. Based on this, the data owner can immediately respond to the data sharing request forwarded by the second edge gateway when receiving it and directly send the original audio-video data to the second edge gateway, thereby achieving real-time sharing of audio-video data.

In step S105 and step S106, the second edge gateway, upon receiving the original audio-video data sent by the data owner, in one possible embodiment, may directly identify the contents of the received original audio-video data, to obtain the second service identification information that is the service identification information for representing service to which the original audio-video data belongs. For example, the contents of the original audio-video data can be identified, and the service identification information with detailed granularity may be extracted through feature library matching. Taking the aforementioned traffic industry as an example again, the second edge gateway obtains the second service identification information (abcd) according to the original audio-video data sent by the data owner.

However, with the increasingly complex network environment, audio-video data face severe security challenges in the process of cross domain sharing. In order to further ensure the security of cross domain sharing of audio-video data, in another possible embodiment, the second edge gateway may perform real-time and comprehensive security scanning and analysis on the audio-video data to be shared. Only audio-video data that has passed security detection can be cross domain shared. Specifically, the original audio-video data may be performed security detection through the following methods:

The second edge gateway acquires the original packet format of the original audio-video data, performs the security detection on the original packet format, and determines the original audio-video data to which original packet format passing the security detection belongs, as the audio-video data to be shared.

The original packet format includes protocol version, length, and content. Wherein, the protocol has emerged to achieve cross domain sharing of the original audio-video data, including SIP (Session Initiation Protocol), RTSP (Real Time Streaming Protocol), ONVIF (Open Network Video Interface Forum), GB28181 (Technical Specification of Video Surveillance Networking System for Security), and private SDKs (Software Development Kits), which provide possibilities for sharing audio-video data among different ends. Therefore, when performing security detection, it is also necessary to detect these protocols. For example, real-time updated security risk packet library or others may be used to perform the security detection on the original packet format. If there is content in the original packet format that matches the security risk packet library, it proves that this content part has security risks. It will be intercepted and a report will be sent to an alarm platform, while the remaining contents do not have security risks. The original audio-video data to which the remaining contents belong may be used as the audio-video data to be shared, and then the contents of the audio-video data to be shared may be identified to obtain the second service identification information that is the service identification information for representing the service to which the audio-video data to be shared belongs.

By applying the above embodiment, the second edge gateway performs security scanning and analysis in real-time and comprehensively, such that secure audio-video data can effectively be filtered out for cross domain sharing, thereby improving the security of audio-video data sharing.

In step S107, the audio-video data may contain privacy information such as personal information, trade secrets, etc. Since the original audio-video data is unstructured data, cross domain sharing of audio-video data may result in the leakage of the privacy information. Therefore, it is necessary to encapsulate the original audio-video data into structured preprocessed audio-video data.

In one possible embodiment, corresponding to the description of step S105 and step S106, the original audio-video data may be directly re-encapsulated. To improve the security of audio-video data sharing, in another possible embodiment, only the original audio-video data that has passed security detection may be encapsulated, that is, only the audio-video data to be shared may be encapsulated. Specifically, the second service identification information obtained according to the audio-video data to be shared, categorizing information, and grading information (i.e., service category and service grade), as well as the second attribute information (which will be explained in the following text and will not be repeated here), may be filled into a header field of the audio-video data to be shared, and then obtained audio-video data can be re-encapsulated to obtain structured preprocessed audio-video data.

Taking the aforementioned GB28181 as an example, one or more NALs (NAL Units) in a PS (Program Stream) packet transmitted by the GB28181 protocol are parsed, and the audio-video data therein are analyzed to obtain the service category, service grade, service identification information (i.e., the aforementioned second service identification information), and attribute set information (i.e., the aforementioned second attribute information) within the service identification information.

For example, by utilizing contextual information of audio and video content (such as scene features, background sounds, etc.), combined with a pre-trained classification model or rule set, the service category to which the audio-video data belongs is determined, such as a category of traffic industry, finance industry, building industry, water conservancy industry, education industry, or a more private category of family, store, enterprise, etc. According to security regulations and guidelines of various industries (such as data sensitivity grading standards), the identified service data is classified into different service grades, such as four grades, with a higher grade indicating higher data sensitivity and requiring stricter security measures. Deep content recognition is performed on the audio-video data, detailed service identification information, such as specific types of events (such as illegal parking, abnormal transactions, etc.), is accurately extracted by comparing pre-established feature library (containing various service identification features). The attribute set within the service identification information, such as the vehicle type, color, timestamp, and other specific attributes in the violation license plate video is further parsed and extracted.

The service category, service grade, second service identification information, and second attribute information obtained from the above analysis are integrated into a security parameter set of the NAL unit, the header parameter of the NAL unit (such as length, type indication, etc.) is adjusted according to the newly added security parameters, the amended NAL unit and a PS package where the NAL unit is located are re-encapsulated to ensure compliance with the transmission requirements of GB28181 protocol.

In step S108 and step S109, based on consideration of the security of audio-video data sharing, it is necessary for the second edge gateway to use the same obfuscation algorithm, as the first edge gateway performing obfuscation to obtain the first obfuscation set, to perform obfuscation on the second service identification information to obtain the second obfuscation set. Specifically, the second obfuscation set may be obtained by performing obfuscation on the second service identification information with the aforementioned HMAC algorithm, or by performing obfuscation on the second service identification information with the aforementioned target data sharing model.

After acquiring the first obfuscation set and the second obfuscation set, the second edge gateway calculates the intersection service identification information of the first obfuscation set and the second obfuscation set. Taking the aforementioned traffic industry as an example again, assuming that the first edge gateway performs obfuscation on the first service identification information (abc) according to a preset obfuscation algorithm to obtain the first obfuscation set (ABC), the second edge gateway performs obfuscation on the second service identification information (abcd) according to the same preset obfuscation algorithm to obtain the second obfuscation set (ABCD), and the second edge gateway calculates the intersection service identification information (ABC) of the first obfuscation set (ABC) and the second obfuscation set (ABCD).

After obtaining the intersection service identification information, in S1010 and S1011, the second edge gateway determines the audio-video data to which the intersection service identification information belongs, in the preprocessed audio-video data, as the first intersection audio-video data, that is, determines the audio-video data to which the intersection service identification information (ABC) belongs as the first intersection audio-video data, and sends the first intersection audio-video data to the first edge gateway.

Through the above methods, the audio-video data requested by the data requester can be filtered from the original audio-video data. However, in the scenario of audio-video data sharing, if the audio-video data includes personal privacy, trade secrets, or data related to social security, the confidentiality, integrity, and availability of the data must be strictly guaranteed. To further ensure the privacy and security of audio-video data sharing, the access permission need to be set for the audio-video data, and categorizing and grading audio-video data are important foundations for managing the access permission. Different categories of the audio-video data often correspond to different security grades and access requirements. In order to ensure the security and compliance of audio-video data sharing process, it is necessary to verify the identity and permission of the data recipient without exposing the actual categorizing and grading information of the audio-video data, that is, to verify the identity and permission information of the data recipient through the above steps S1012-S1019.

In step S1012, the identity information and permission information may be sent together with the data sharing request to the first edge gateway. After receiving the data sharing request, identity information, and permission information, the first edge gateway may first generate the first service identification information and the first encrypted information according to the data sharing request, identity information, and permission information, and then proceed with the subsequent steps.

In step S1013 and step S1015, the preset encryption algorithm may be homomorphic encryption algorithm or order preserving encryption algorithm, with the purpose of performing encrypted calculation without exposing the actual categorizing and grading information of the audio-video data to be shared, to determine whether the data recipient has access permission for the audio-video data requested by itself.

In step S1017, if the identity of the data recipient has a permission to acquire and operate the categorizing and grading data (such as through operations such as addition, subtraction, multiplication, division, size comparison between plaintext and ciphertext or between ciphertext and ciphertext to determine a relationship between an identity permission value and a data categorizing and grading value), the data sharing flow can continue. If the identity of the data recipient does not have such permission, the RBSP (original byte sequence payload) payload data in the audio-video data owned by the data owner will be further processed by using a desensitization algorithm based on the principle of minimizing permissions, and the protocol will be re-encapsulated. The desensitization method can be described in the following text and will not be repeated here.

In step S1019, the first edge gateway sends the second intersection audio-video data to the data recipient, wherein, the second intersection audio-video data only includes audio-video data corresponding to the data requester's current request service, for which the data requester has access permission. Other audio-video data have been desensitized and cannot be viewed, such that the risk of privacy information leakage is avoided. Therefore, when the data owner does not know the identity information of the data recipient, the service requested each time, and the data recipient does not know the categorizing information and grading information of the audio-video data, as well as any other audio-video data information outside the scope of the data sharing request, secure sharing of audio-video data with full anonymous privacy has been safely completed. Based on this, taking the aforementioned traffic industry as an example, the data recipient can acquire the video recordings of road a, road b, and road c shot by the data owner, and then complete the analysis of congestion of people on road.

In this article, calculating intersection processing through obfuscation based on the service identification information and attribute information may also be replaced by technical steps such as calculating intersection through privacy and secret fragmentation.

By applying the above embodiment, the first edge gateway performs encryption on the identity information and permission information of the data recipient by using the preset encryption algorithm, such that the confidentiality of sensitive information is ensured and unauthorized access is prevented. At the same time, the second edge gateway intelligently identifies the first intersection audio-video data, categorizes and encrypts the service category and grade information thereof, such that the security of the privacy of service information is further ensured. The first edge gateway achieves precise selecting and protection of transmitting the audio-video data by calculating the intersection encrypted information of the first encrypted information and the second encrypted information, such that it is ensured that only audio-video data that meets the security policies and service requirements of both parties is effectively transmitted. Finally, only the second intersection audio-video data that the data recipient has access permission for, is sent to the data recipient, such that not only the occupation of resources in the system for securely sharing audio-video data is reduced, but also the pertinence and security of audio-video data transmission is increased, a more efficient and secure audio-video data sharing experience is provided.

In one possible embodiment, the data recipient may analyze the congestion of people on various roads directly according to the video recordings obtained from shooting roads a, b, and c. However, it may be understood that the road not only contains the personnel, but also objects such as vehicles, landscape plants, and buildings.

Figure 3:
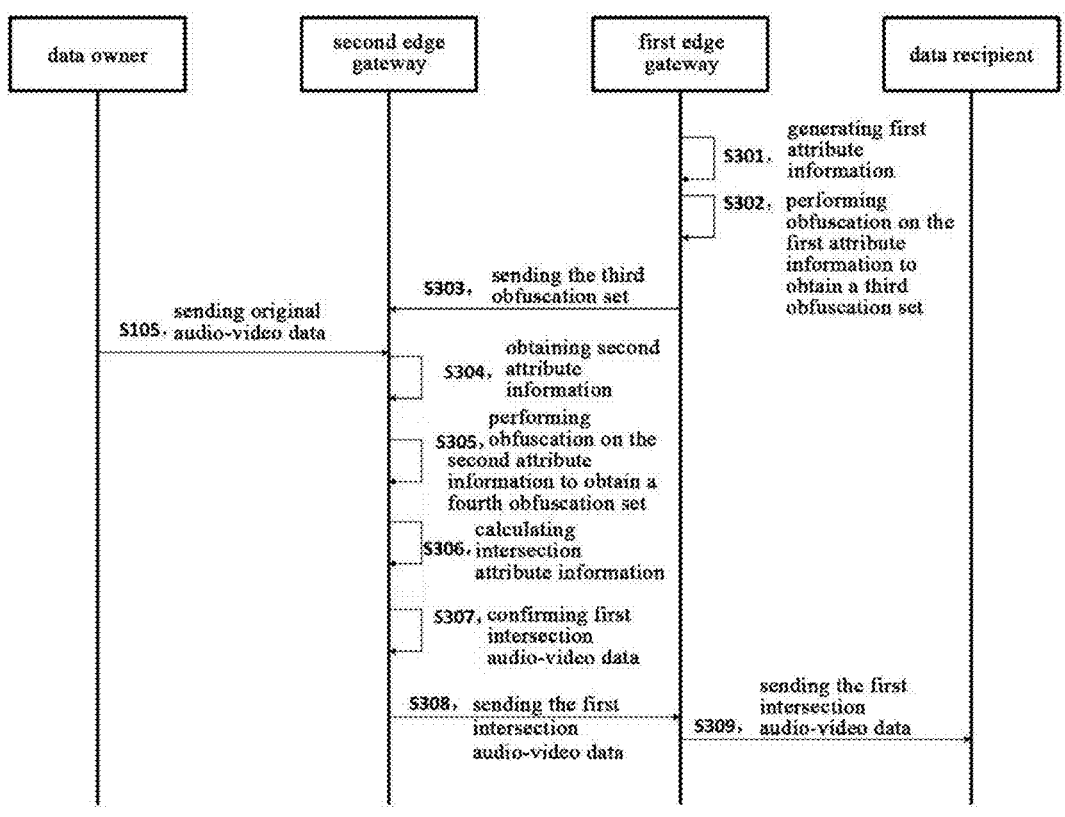
FIG. 3 is a second schematic flow chart of a method for securely sharing audio-video data based on full anonymous privacy computation provided by an embodiment of the present application.

Based on this, in order to effectively prevent the leakage of irrelevant or sensitive audio-video data, improve the pertinence and accuracy of audio-video data sharing, and thus achieve secure sharing of audio-video data, in another possible embodiment, an object in the audio-video data requested by the data recipient may be matched with an object in the audio-video data owned by the data owner, referring to FIG. 3, which is a second schematic flow chart of a method for securely sharing audio-video data based on full anonymous privacy computation provided by an embodiment of the present application, including:

S301, a first edge gateway generates first attribute information for representing an attribute of a target object in response to a data sharing request sent by a data recipient, wherein the target object is an object to which audio-video data requested by the data sharing request belongs;

S302, the first edge gateway performs obfuscation on the first attribute information according to the preset obfuscation algorithm to obtain a third obfuscation set;

S303, the first edge gateway sends the third obfuscation set to a second edge gateway;

S304, the second edge gateway performs identification on contents of the original audio-video data (i.e. performs identification on the contents of the original audio-video data in step S105) to obtain attribute information for representing attribute of each object in the original audio-video data, as second attribute information;

S305, the second edge gateway performs obfuscation on the second attribute information according to the preset obfuscation algorithm to obtain a fourth obfuscation set;

S306, the second edge gateway calculates intersection attribute information of the third obfuscation set and the fourth obfuscation set;

S307, the second edge gateway confirms audio-video data to which both the intersection service identification information and the intersection attribute information belong, in preprocessed audio-video data, as first intersection audio-video data;

S308, the second edge gateway sends the first intersection audio-video data to the first edge gateway;

S309, the first edge gateway sends the first intersection audio-video data to the data recipient.

The above attribute information is for representing an attribute of each object, which varies depending on the present application scenario. For example, in the scenario of analyzing the situation of the road personnel congestion, the attribute information may be coordinate information of a person in the respective crossing video recording, a time-stamp of appearance of a person, etc. In the monitoring of violation vehicles, the attribute information may be specific attributes such as the vehicle type, color, timestamp, etc. in the video recording of the violation license plate.

In steps S304-S305, the attribute information of each object in the original audio-video data is performed obfuscation. Taking the preset obfuscation algorithm as the HMAC algorithm as an example, the obfuscation method is to perform an HRC operation on the attribute information of each object to obtain the fourth obfuscation set.

In step S306, after receiving the fourth obfuscation set, the second edge gateway calculates intersection on the third obfuscation set and the fourth obfuscation set. Since the third obfuscation set is also obtained by using the same preset obfuscation algorithm to perform obfuscation on the attribute of the object to which the audio-video data requested by the data recipient belongs, if the third obfuscation set matches the fourth obfuscation set, it proves that the data owned by the data owner is exactly the data requested by the data recipient, and the objects to which the audio-video data belongs are also the same. If the third obfuscation set does not match the fourth obfuscation set, it proves that the audio-video data owned by the data owner not only contains the audio-video data requested by the data recipient, but also contains other audio-video data not requested by the data recipient, that is, redundant data. Therefore, it is necessary to remove the redundant data and not share it to the data recipient. The specific removal method can be based on the principle of minimizing the permission, that is, only retaining the audio-video data requested by the data recipient, and performing desensitization algorithm processing on the RBSP (original byte sequence payload) payload data in the audio-video data owned by the data owner, such as sensitive information masking or data random permutation, and then re-encapsulating the obtained audio-video data. This part of the data obtained from re-encapsulating is the audio-video data requested by the data recipient, that is, the first intersection audio-video data.

In step S307, the audio-video data to which both the intersection service identification information and the intersection attribute information belong, refers to that the determined first intersection audio-video data is both the audio-video data to which the intersection service identification information belongs and the audio-video data to which the intersection attribute information belongs.

By applying the above embodiment, by calculating the intersection on the third obfuscation set generated by the first edge gateway and the fourth obfuscation set generated by the second edge gateway, the intersection attribute information is obtained, and then the audio-video data that contains both intersection service identification information and intersection attribute information (i.e., the first intersection audio-video data) is accurately identified in the preprocessed audio-video data. This method based on the intersection of the obfuscation set may effectively prevent the leakage of irrelevant or sensitive audio-video data, significantly improve the accuracy and efficiency of data matching, reduce unnecessary data transmission and processing, lower system resource consumption, and finally achieve secure and efficient sharing of audio-video data.

Figure 4:
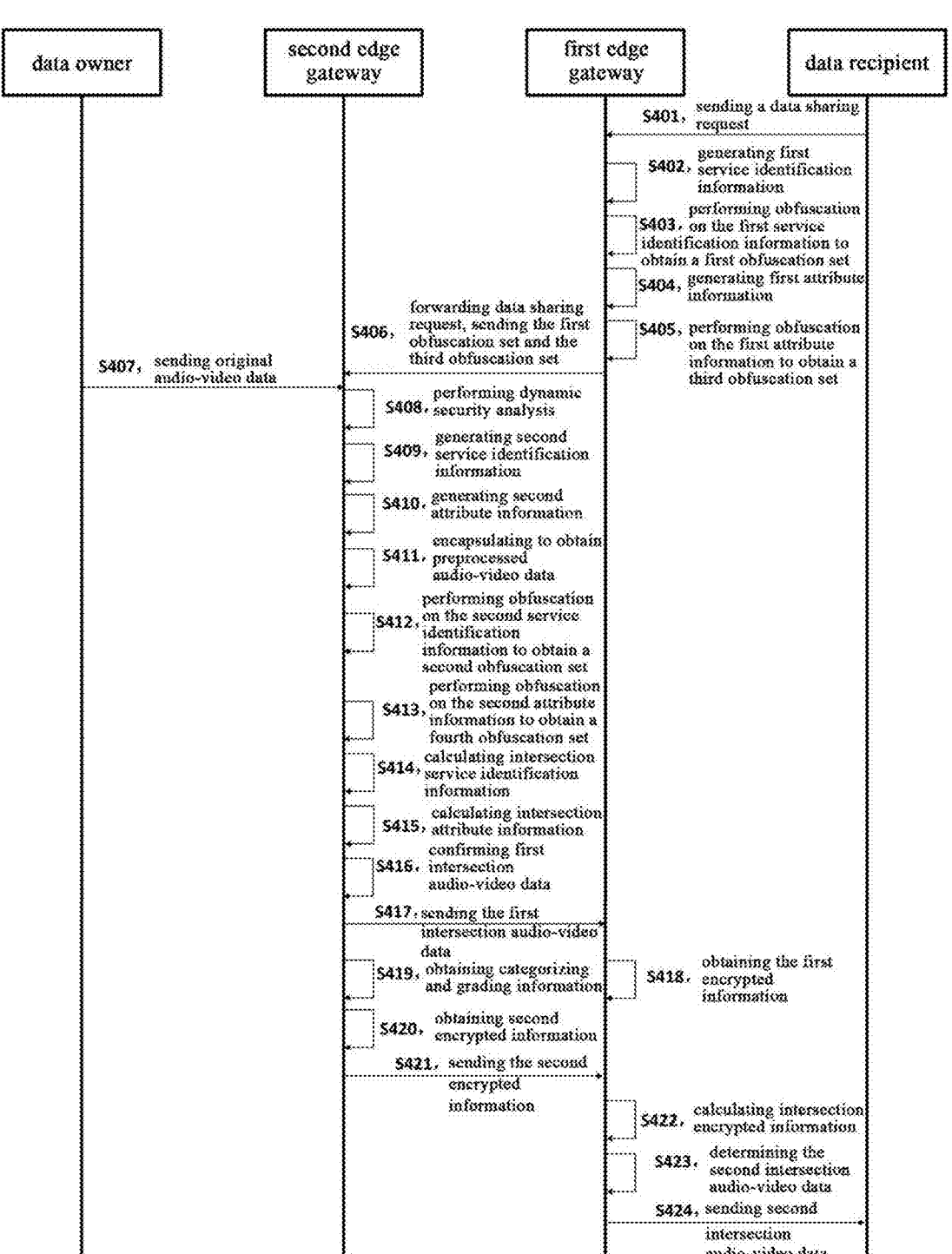
FIG. 4 is a third schematic flow chart of a method for securely sharing audio-video data based on full anonymous privacy computation provided by an embodiment of the present application.

An entire flow of audio-video data sharing and the system for securely sharing audio-video data provided in the present application will be exemplarily described below:

Referring to FIG. 4, it is a third schematic flow chart of a method for securely sharing audio-video data based on full anonymous privacy computation provided by an embodiment of the present application, including:

S401, a data recipient sends a data sharing request to a first edge gateway; S402, the first edge gateway generates first service identification information for representing a target service in response to the data sharing request;

S403, the first edge gateway performs obfuscation on the first service identification information according to a preset obfuscation algorithm to obtain a first obfuscation set;

S404, the first edge gateway generates first attribute information for representing an attribute of a target object in response to the data sharing request;

S405, the first edge gateway performs obfuscation on the first attribute information according to the preset obfuscation algorithm to obtain a third obfuscation set;

S406, the first edge gateway forwards the data sharing request to a second edge gateway and sends the first obfuscation set and the third obfuscation set to the second edge gateway;

S407, a data owner sends original audio-video data to the second edge gateway;

S408, the second edge gateway performs dynamic security analysis on the original audio-video data, that is, performs the security detection on an original packet format of the original audio-video data to obtain audio-video data to be shared;

S409, the second edge gateway generates second service identification information for representing a service to which the audio-video data to be shared belongs, according to contents of the audio-video data to be shared;

S410, the second edge gateway generates second attribute information for representing an attribute of each object in the audio-video data to be shared, according to the contents of the audio-video data to be shared;

S411, the second edge gateway encapsulates the audio-video data to be shared and the second service identification information to obtain preprocessed audio-video data;

S412, the second edge gateway performs obfuscation on the second service identification information to obtain a second obfuscation set;

S413, the second edge gateway performs obfuscation on the second attribute information to obtain a fourth obfuscation set;

S414, the second edge gateway calculates intersection service identification information of the first obfuscation set and the second obfuscation set;

S415, the second edge gateway calculates intersection attribute information of the third obfuscation set and the fourth obfuscation set;

S416, the second edge gateway confirms audio-video data to which both the intersection service identification information and intersection attribute information belong, in the preprocessed audio-video data, as first intersection audio-video data;

S417, the second edge gateway sends the first intersection audio-video data to the first edge gateway;

S418, the first edge gateway performs encryption on identity information and permission information sent by the data recipient according to a preset encryption algorithm to obtain first encrypted information;

S419, the second edge gateway obtains categorizing information for representing the service category of a service to which the first intersection audio-video data belongs and grading information for representing the service grade of a service to which the first intersection audio-video data belongs, according to the first intersection audio-video data;

S420, the second edge gateway performs encryption on the categorizing information and grading information according to the preset encryption algorithm to obtain second encrypted information;

S421, the second edge gateway sends the second encrypted information to the first edge gateway;

S422, the first edge gateway calculates intersection encrypted information of the first encrypted information and the second encrypted information;

S423, the first edge gateway determines audio-video data to which the intersection encrypted information belongs, in the first intersection audio-video data, as second intersection audio-video data;

S424, the first edge gateway sends the second intersection audio-video data to the data recipient.

Through the above steps S401-S424, the system for securely sharing audio-video data not only meets the requirements of audio-video data sharing, but also effectively protects the privacy and security of the audio-video data, prevents the leakage of sensitive information, and thus improves the security of audio-video data sharing, achieves a secure audio-video data sharing mechanism.

Corresponding to the above system for securely sharing audio-video data, an embodiment of the present application further provides a method for securely sharing audio-video data applied to the first edge gateway, referring to FIG. 5, which is a fourth schematic flow chart of a method for securely sharing audio-video data based on full anonymous privacy computation provided by an embodiment of the present application, including:

S501, generating first service identification information for representing a target service in response to a data sharing request sent by a data recipient, wherein the target service is a service to which audio-video data requested by the data sharing request belongs.

S502, performing obfuscation on the first service identification information according to a preset obfuscation algorithm to obtain a first obfuscation set.

S503, sending the first obfuscation set to a second edge gateway, enabling the second edge gateway to calculate intersection service identification information of the first obfuscation set and the second obfuscation set, determine audio-video data to which the intersection service identification information belongs, in preprocessed audio-video data, as first intersection audio-video data, and send the first intersection audio-video data to the first edge gateway.

Wherein, the second obfuscation set is obtained by the second edge gateway performing obfuscation on second service identification information according to the preset obfuscation algorithm, the second service identification information is service identification information for representing a service to which original audio-video data belongs, which is obtained by the second edge gateway performing identification on contents of the original audio-video data, the original audio-video data is sent by a data owner to the second edge gateway, and the preprocessed audio-video data is obtained by the second edge gateway encapsulating the original audio-video data and the second service identification information.

S504, performing encryption on identity information and permission information sent by the data recipient according to a preset encryption algorithm to obtain first encrypted information;

S505, calculating intersection encrypted information of the first encrypted information and second encrypted information.

Wherein, the second encrypted information is obtained by the second edge gateway performing encryption on the categorizing information and the grading information according to the preset encryption algorithm, and the categorizing information and the grading information are respectively information for representing the service category and service grade of a service to which the first intersection audio-video data belongs, which are obtained by the second edge gateway performing identification on contents of the first intersection audio-video data.

S506, determining audio-video data to which the intersection encrypted information belongs, in the first intersection audio-video data, as second intersection audio-video data, and sending the second intersection audio-video data to the data recipient.

By applying the above embodiment, high privacy protection and precise access control of the sharing process of audio-video data have been achieved by introducing a cooperation mechanism of the first edge gateway and the second edge gateway. The system encapsulates the original audio-video data to obtain structured audio-video data, and performs obfuscation on the service identification information according to the preset obfuscation algorithm, such that the requirements of audio-video data sharing are met, direct exposure of the service information is effectively avoided, and the privacy and security of the audio-video data are increased; meanwhile, determines shareable audio-video data by calculating the intersection of the obfuscation sets, such that the accuracy of data access is ensured. In addition, a preset encryption algorithm is used to perform encryption on the identity information and permission information of the data recipient, as well as the categorizing information and grading information of the audio-video data. Only audio-video data that the data recipient has access permission for, is sent to the data recipient, such that not only the resource occupation of the system for securely sharing audio-video data is reduced, but also the pertinence and security of audio-video data transmission is improved. Finally, under the premise of ensuring data privacy, the system not only meets the requirements of audio-video data sharing, but also effectively protects the privacy and security of the audio-video data, prevents the leakage of sensitive information, and thus improves the security of audio-video data sharing, achieves a secure audio-video data sharing mechanism.

The above steps S501-S504 are similar to the steps executed by the aforementioned system for securely sharing audio-video data. Please refer to the description of the steps executed by the aforementioned system for securely sharing audio-video data, which will not be repeated here.

Corresponding to the above system for securely sharing audio-video data, an embodiment of the present application further provides a method for securely sharing audio-video data applied to the second edge gateway, referring to FIG. 6, which is a fifth schematic flow chart of a method for securely sharing audio-video data based on full anonymous privacy computation provided by an embodiment of the present application, including:

S601, receiving a first obfuscation set sent by a first edge gateway.

Wherein, the first obfuscation set is obtained by the first edge gateway performing obfuscation on first service identification information according to a preset obfuscation algorithm, the first service identification information is service identification information for representing a target service, which is generated by the first edge gateway in response to a data sharing request sent by a data recipient, wherein the target service is a service to which audio-video data requested by the data sharing request belongs.

S602, receiving original audio-video data sent by a data owner, performing identification on contents of the original audio-video data, to obtain service identification information for representing a service to which the original audio-video data belongs, as second service identification information.

S603, encapsulating the original audio-video data and the second service identification information to obtain pre-processed audio-video data.

S604, performing obfuscation on the second service identification information according to the preset obfuscation algorithm to obtain a second obfuscation set.

S605, calculating intersection service identification information of the first obfuscation set and the second obfuscation set.

S606, determining audio-video data to which the intersection service identification information belongs, in the preprocessed audio-video data, as first intersection audio-video data, and sending the first intersection audio-video data to the first edge gateway;

S607, performing identification on contents of the first intersection audio-video data to obtain a service category as categorizing information and a service grade as grading information, both of the service category and the service grade are configured for representing a service to which the first intersection audio-video data belongs;

S608, performing encryption on the categorizing information and the grading information according to the preset encryption algorithm to obtain second encrypted information;

S609, sending the second encrypted information to the first edge gateway, enabling the first edge gateway to calculate intersection encrypted information of the first encrypted information and the second encrypted information, determine audio-video data to which the intersection encrypted information belongs, in the first intersection audio-video data, as second intersection audio-video data, and send the second intersection audio-video data to the data recipient.

Wherein, the first encrypted information is obtained by the first edge gateway performing encryption on identity information and permission information sent by the data recipient, according to the preset encryption algorithm.

By applying the above embodiment, high privacy protection and precise access control of the sharing process of audio-video data have been achieved by introducing a cooperation mechanism of the first edge gateway and the second edge gateway. The system encapsulates the original audio-video data to obtain structured audio-video data, and performs obfuscation on the service identification information according to the preset obfuscation algorithm, such that the requirements of audio-video data sharing are met, direct exposure of the service information is effectively avoided, and the privacy and security of the audio-video data are increased; meanwhile, determines shareable audio-video data by calculating the intersection of the obfuscation sets, such that the accuracy of data access is ensured. In addition, a preset encryption algorithm is used to perform encryption on the identity information and permission information of the data recipient, as well as the categorizing information and grading information of the audio-video data. Only audio-video data that the data recipient has access permission for, is sent to the data recipient, such that not only the occupation of the system for securely sharing audio-video data resources is reduced, but also the pertinence and security of audio-video data transmission is improved. Finally, under the premise of ensuring data privacy, the system not only meets the requirements of audio-video data sharing, but also effectively protects the privacy and security of the audio-video data, prevents the leakage of sensitive information, and thus improves the security of audio-video data sharing, achieves a secure audio-video data sharing mechanism.

The above steps S601-S606 are similar to the steps executed by the aforementioned system for securely sharing audio-video data. Please refer to the description of the steps executed by the aforementioned system for securely sharing audio-video data, which will not be repeated here.

Figure 7:
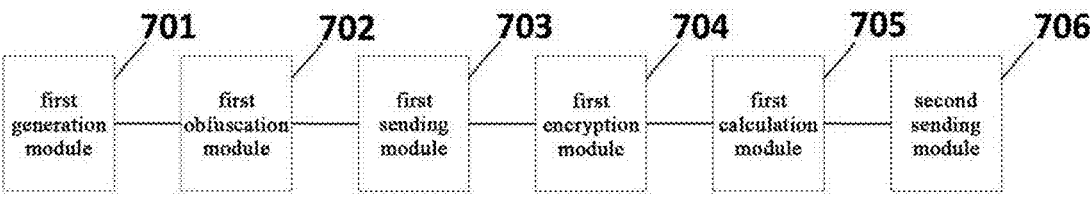
FIG. 7 is a first schematic diagram of a structure of an apparatus for securely sharing audio-video data based on full anonymous privacy computation provided by an embodiment of the present application.

Corresponding to the above method for securely sharing audio-video data applied to the first edge gateway, an embodiment of the present application further provides an apparatus for securely sharing audio-video data based on full anonymous privacy computation applied to the first edge gateway, referring to FIG. 7, which is a first schematic diagram of a structure of an apparatus for securely sharing audio-video data based on full anonymous privacy computation provided by an embodiment of the present application, including:

a first generation module 701, configured for generating first service identification information for representing a target service in response to a data sharing request sent by a data recipient, wherein the target service is a service to which audio-video data requested by the data sharing request belongs;

a first obfuscation module 702, configured for performing obfuscation on the first service identification information according to a preset obfuscation algorithm to obtain a first obfuscation set;

a first sending module 703, configured for sending the first obfuscation set to the second edge gateway, enabling the second edge gateway to calculate intersection service identification information of the first obfuscation set and the second obfuscation set, determine audio-video data to which the intersection service identification information belongs, in the preprocessed audio-video data, as first intersection audio-video data, and send the first intersection audio-video data to the first edge gateway, wherein, the second obfuscation set is obtained by the second edge gateway performing obfuscation on second service identification information according to the preset obfuscation algorithm, the second service identification information is service identification information for representing a service to which original audio-video data belongs, which is obtained by the second edge gateway performing identification on contents of the original audio-video data, the original audio-video data is sent by a data owner to the second edge gateway, and the preprocessed audio-video data is obtained by the second edge gateway encapsulating the original audio-video data and the second service identification information;

a first encryption module 704, configured for performing encryption on identity information and permission information sent by the data recipient according to a preset encryption algorithm to obtain first encrypted information;

a first calculation module 705, configured for calculating intersection encrypted information of the first encrypted information and the second encrypted information, wherein, the second encrypted information is obtained by the second edge gateway performing encryption on the categorizing information and the grading information according to the preset encryption algorithm, and the categorizing information and the grading information are respectively information for representing a service category and service grade of a service to which the first intersection audio-video data belongs, which are obtained by the second edge gateway performing identification on contents of the first intersection audio-video data;

a second sending module 706, configured for determining audio-video data to which the intersection encrypted information belongs, in the first intersection audio-video data, as second intersection audio-video data, and sending the second intersection audio-video data to the data recipient.

By applying the above embodiment, high privacy protection and precise access control of the sharing process of audio-video data have been achieved by introducing a cooperation mechanism of the first edge gateway and the second edge gateway. The system encapsulates the original audio-video data to obtain structured audio-video data, and performs obfuscation on the service identification information according to the preset obfuscation algorithm, such that the requirements of audio-video data sharing are met, direct exposure of the service information is effectively avoided, and the privacy and security of the audio-video data are increased; meanwhile, determines shareable audio-video data by calculating the intersection of the obfuscation sets, such that the accuracy of data access is ensured. In addition, a preset encryption algorithm is used to perform encryption on the identity information and permission information of the data recipient, as well as the categorizing information and grading information of the audio-video data. Only audio-video data that the data recipient has access permission for, is sent to the data recipient, such that not only the resource occupation of the system for securely sharing audio-video data is reduced, but also the pertinence and security of audio-video data transmission is improved. Finally, under the premise of ensuring data privacy, the system not only meets the requirements of audio-video data sharing, but also effectively protects the privacy and security of the audio-video data, prevents the leakage of sensitive information, and thus improves the security of audio-video data sharing, achieves a secure audio-video data sharing mechanism.

In one possible implementation, the apparatus further includes:

a fourth generation module, configured for generating first attribute information for representing an attribute of a target object in response to the data sharing request sent by the data recipient, wherein the target object is an object to which the audio-video data requested by the data sharing request belongs;

a third obfuscation module, configured for performing obfuscation on the first attribute information according to the preset obfuscation algorithm to obtain a third obfuscation set;

a fourth sending module, configured for sending the third obfuscation set to the second edge gateway, enabling the second edge gateway to calculate intersection attribute information of the third obfuscation set and the fourth obfuscation set, wherein, the fourth obfuscation set is obtained by the second edge gateway performing obfuscation on the second attribute information according to the preset obfuscation algorithm, and the second attribute information is attribute information for representing an attribute of each object in the original audio-video data, which is obtained by the second edge gateway performing identification on contents of the original audio-video data;

the first sending module includes:

a first sending submodule, configured for determining audio-video data to which both the intersection service identification information and the intersection attribute information belong, in the preprocessed audio-video data, as the first intersection audio-video data.

Figure 8:
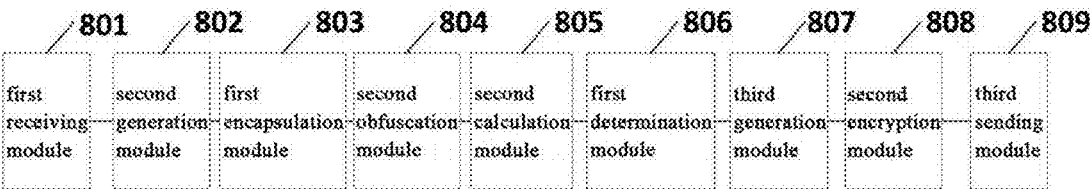
FIG. 8 is a second schematic diagram of a structure of an apparatus for securely sharing audio-video data based on full anonymous privacy computation provided by an embodiment of the present application.

Corresponding to the aforementioned method for securely sharing audio-video data based on full anonymous privacy computation applied to the second edge gateway, an embodiment of the present application further provides an apparatus for securely sharing audio-video data based on full anonymous privacy computation applied to the second edge gateway, referring to FIG. 8, which is a second schematic diagram of a structure of an apparatus for securely sharing audio-video data based on full anonymous privacy computation provided by an embodiment of the present application, including:

a first receiving module 801, configured for receiving a first obfuscation set sent by a first edge gateway, wherein, the first obfuscation set is obtained by the first edge gateway performing obfuscation on first service identification information according to a preset obfuscation algorithm, the first service identification information is service identification information for representing a target service, which is generated by the first edge gateway in response to a data sharing request sent by a data recipient, the target service is a service to which audio-video data requested by the data sharing request belongs;

a second generation module 802, configured for receiving original audio-video data sent by a data owner, performing identification on contents of the original audio-video data to obtain service identification information for representing a service to which the original audio-video data belongs, as second service identification information;

a first encapsulation module 803, configured for encapsulating the original audio-video data and the second service identification information to obtain preprocessed audio-video data;

a second obfuscation module 804, configured for performing obfuscation on the second service identification information according to the preset obfuscation algorithm to obtain a second obfuscation set;

a second calculation module 805, configured for calculating intersection service identification information of the first obfuscation set and the second obfuscation set;

a first determination module 806, configured for determining audio-video data to which the intersection service identification information belongs, in the preprocessed audio-video data, as first intersection audio-video data, and sending the first intersection audio-video data to the first edge gateway;

a third generation module 807, configured for performing identification on contents of the first intersection audio-video data, to obtain a service category as categorizing information and a service grade as grading information, both of the service category and the service grade are configured for representing a service to which the first intersection audio-video data belongs;

a second encryption module 808, configured for performing encryption on the categorizing information and the grading information according to the preset encryption algorithm to obtain second encrypted information;

a third sending module 809, configured for sending the second encrypted information to the first edge gateway, enabling the first edge gateway to calculate intersection encrypted information of the first encrypted information and the second encrypted information, determine audio-video data to which the intersection encrypted information belongs, in the first intersection audio-video data, as second intersection audio-video data, and send the second intersection audio-video data to the data recipient, wherein, the first encrypted information is obtained by the first edge gateway performing encryption on identity information and permission information sent by the data recipient according to the preset encryption algorithm.

By applying the above embodiment, high privacy protection and precise access control of the sharing process of audio-video data have been achieved by introducing a cooperation mechanism of the first edge gateway and the second edge gateway. The system encapsulates the original audio-video data to obtain structured audio-video data, and performs obfuscation on the service identification information according to the preset obfuscation algorithm, such that the requirements of audio-video data sharing are met, direct exposure of the service information is effectively avoided, and the privacy and security of the audio-video data are increased; meanwhile, determines shareable audio-video data by calculating the intersection of the obfuscation sets, such that the accuracy of data access is ensured. In addition, a preset encryption algorithm is used to perform encryption on the identity information and permission information of the data recipient, as well as the categorizing information and grading information of the audio-video data. Only audio-video data that the data recipient has access permission for, is sent to the data recipient, such that not only the occupation of the system for securely sharing audio-video data resources is reduced, but also the pertinence and security of audio-video data transmission is improved. Finally, under the premise of ensuring data privacy, the system not only meets the requirements of audio-video data sharing, but also effectively protects the privacy and security of the audio-video data, prevents the leakage of sensitive information, and thus improves the security of audio-video data sharing, achieves a secure audio-video data sharing mechanism.

In one possible implementation, the apparatus further includes:

a second receiving module, configured for receiving a third obfuscation set sent by the first edge gateway, wherein, the third obfuscation set is obtained by the first edge gateway performing obfuscation on first attribute information according to the preset obfuscation algorithm, the first attribute information is attribute information for representing an attribute of a target object, which is generated by the first edge gateway in response to the data sharing request sent by the data recipient, the target object is an object to which the audio-video data requested by the data sharing request belongs;

a fifth generation module, configured for performing identification on contents of the original audio-video data, to obtain attribute information for representing an attribute of each object in the original audio-video data as second attribute information;

a fourth obfuscation module, configured for performing obfuscation on the second attribute information according to the preset obfuscation algorithm to obtain a fourth obfuscation set;

a third calculation module, configured for calculating intersection attribute information of the third obfuscation set and the fourth obfuscation set;

the first determination module includes:

a first determination submodule, configured for determining audio-video data to which both the intersection service identification information and the intersection attribute information belong, in the preprocessed audio-video data, as first intersection audio-video data.

In one possible implementation, the apparatus further includes:

a first detection module, configured for acquiring an original packet format of the original audio-video data, performing security detection on the original packet format, and determining the original audio-video data to which the original packet format that passes the security detection belongs, as audio-video data to be shared;

the first encapsulation module includes:

a first encapsulation submodule, configured for encapsulating the audio-video data to be shared and the second attribute information obtained according to the audio-video data to be shared to obtain the preprocessed audio-video data.

Figure 9:
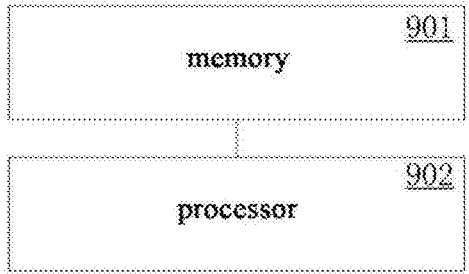
FIG. 9 is a schematic diagram of a structure of an electronic device provided by an embodiment of the present application.

An embodiment of the present application further provides an electronic device, as shown in FIG. 9, including:

a memory 901, configured for storing a computer program;

a processor 902, configured for implementing the following steps when executing the program stored on the memory 901:

generating first service identification information for representing a target service in response to a data sharing request sent by a data recipient, wherein the target service is a service to which audio-video data requested by the data sharing request belongs;

performing obfuscation on the first service identification information according to a preset obfuscation algorithm to obtain a first obfuscation set;

sending the first obfuscation set to the second edge gateway, enabling the second edge gateway to calculate intersection service identification information of the first obfuscation set and the second obfuscation set, determine audio-video data to which the intersection service identification information belongs, in the pre-processed audio-video data, as first intersection audio-video data, and send the first intersection audio-video data to the first edge gateway, wherein, the second obfuscation set is obtained by the second edge gateway performing obfuscation on second service identification information according to the preset obfuscation algorithm, the second service identification information is service identification information for representing a service to which original audio-video data belongs, which is obtained by the second edge gateway performing identification on contents of the original audio-video data, the original audio-video data is sent by a data owner to the second edge gateway, and the pre-processed audio-video data is obtained by the second edge gateway encapsulating the original audio-video data and the second service identification information;

performing encryption on identity information and permission information sent by the data recipient according to a preset encryption algorithm to obtain first encrypted information;

calculating intersection encrypted information of the first encrypted information and the second encrypted information, wherein, the second encrypted information is obtained by the second edge gateway performing encryption on the categorizing information and the grading information according to the preset encryption algorithm, and the categorizing information and the grading information are respectively information for representing a service category and service grade of a service to which the first intersection audio-video data belongs, which are obtained by the second edge gateway performing identification on contents of the first intersection audio-video data;

determining audio-video data to which the intersection encrypted information belongs, in the first intersection audio-video data, as second intersection audio-video data, and sending the second intersection audio-video data to the data recipient;

or, receiving a first obfuscation set sent by a first edge gateway, wherein, the first obfuscation set is obtained by the first edge gateway performing obfuscation on first service identification information according to a preset obfuscation algorithm, the first service identification information is service identification information for representing a target service, which is generated by the first edge gateway in response to a data sharing request sent by a data recipient, the target service is a service to which audio-video data requested by the data sharing request belongs;

receiving original audio-video data sent by a data owner, performing identification on contents of the original audio-video data to obtain service identification information for representing a service to which the original audio-video data belongs, as second service identification information;

encapsulating the original audio-video data and the second service identification information to obtain preprocessed audio-video data;

performing obfuscation on the second service identification information according to the preset obfuscation algorithm to obtain a second obfuscation set;

calculating intersection service identification information of the first obfuscation set and the second obfuscation set;

determining audio-video data to which the intersection service identification information belongs, in the pre-processed audio-video data, as first intersection audio-video data, and sending the first intersection audio-video data to the first edge gateway;

performing identification on contents of the first intersection audio-video data, to obtain a service category as categorizing information and a service grade as grading information, both of which are configured for representing a service to which the first intersection audio-video data belongs;

performing encryption on the categorizing information and the grading information according to the preset encryption algorithm to obtain second encrypted information;

sending the second encrypted information to the first edge gateway, enabling the first edge gateway to calculate intersection encrypted information of the first encrypted information and the second encrypted information, determine audio-video data to which the intersection encrypted information belongs, in the first intersection audio-video data, as second intersection audio-video data, and send the second intersection audio-video data to the data recipient, wherein, the first encrypted information is obtained by the first edge gateway performing encryption on identity information and permission information sent by the data recipient according to the preset encryption algorithm.

Furthermore, the above electronic device may further include a communication bus and/or communication interface, and the processor 902, the communication interface and the memory 901 communicate each other through the communication bus.

The communication bus mentioned in the above electronic device can be a Peripheral Component Interconnect (PCI) bus or an Extended Industry Standard Architecture (EISA) bus, etc. The communication bus can be divided into an address bus, a data bus, a control bus and so on. For ease of presentation, only a thick line is shown in the figure, but this does not mean that there is only one bus or one type of bus.

The communication interface is used for communication between the electronic devices and other devices.

The Memory may include a Random Access Memory (RAM) or a Non-Volatile memory (NVM), such as at least one disk memory. Optionally, the memory may also be at least one storage device located away from the processor.

The above processor may be a general-purpose processor, including a Central Processing Unit (CPU), a Network Processor (NP), etc.; it may also be a Digital Signal Processor (DSP), an Application Specific Integrated Circuit (ASIC), a Field-Programmable Gate Array (FPGA) or other programmable logic devices, discrete gates or transistor logic devices, discrete hardware components.

In yet another embodiment provided by the present application, a computer-readable storage medium is further provided, which stores a computer program therein, which when executed by a processor, implements any one of steps of the method for securely sharing audio-video data based on full anonymous privacy computation applied to the first edge gateway or the method for securely sharing audio-video data based on full anonymous privacy computation applied to the second edge gateway.

In yet another embodiment provided by the present application, a computer program product containing instructions is further provided, which when running on a computer, cause the computer to carry out any one of the method for securely sharing audio-video data based on full anonymous privacy computation applied to the first edge gateway or the method for securely sharing audio-video data based on full anonymous privacy computation applied to the second edge gateway as described in the above embodiments.

In the above embodiments, it may be implemented in whole or in part by software, hardware, firmware or any combination thereof. When implemented in software, it can be implemented in whole or in part in the form of a computer program product. The computer program product includes one or more computer instructions. When the computer program instructions are loaded and executed on a computer, the processes or functions described in the embodiments of the present application are generated in whole or in part. The computer may be a general purpose computer, special purpose computer, computer network, or other programmable device. The computer instructions may be stored in a computer readable storage medium or transmitted from one computer readable storage medium to another computer readable storage medium, for example, the computer instructions may be transmitted from a website, computer, server or data center to another website, computer, server, or data center by wire (such as coaxial cable, fiber optic, digital subscriber line (DSL)) or wirelessly (such as infrared, wireless, microwave, etc.). The computer-readable storage medium may be any available medium that can be accessed by a computer or a data storage device such as a server and a data center and the like that includes an integration of one or more available medium. The available medium may be magnetic media (such as floppy disk, hard disk, magnetic tape), optical media (such as DVD) or solid state drives (SSDs), etc.

It should be noted that in this article, relational terms such as first and second are only to distinguish one entity or operation from another, and do not necessarily require or imply any actual relationship or order between these entities or operations. Moreover, the terms "include", "contain", or any other variation thereof are intended to encompass a non-exclusive inclusion, such that a process, method, article, or device that includes a series of elements not only includes those elements, but also other elements that are not explicitly listed, or also include elements inherent in such a process, method, article, or device. Without further limitations, the elements limited by the statement "including one . . . " do not exclude the existence of other identical elements in the process, method, article, or device that includes the elements.

The various embodiments in this specification are described in a relevant manner, and the same and similar parts between the various embodiments can be referred to each other, and each embodiment focuses on the differences from other embodiments. In particular, for the embodiments of system, since the description is basically similar to the embodiments of the method, is relatively simple, and the relevant points can be referred to the partial description of the embodiment of the method.

The above descriptions are only preferred embodiments of the present application, and are not intended to limit the scope of protection of the present application. Any modifications, equivalent replacements, improvements, etc. made within the spirit and principles of the present application shall be included within the scope of protection of the present application.

The invention claimed is:

1. A system for securely sharing audio-video data based on full anonymous privacy computation, which comprises a first hardware edge gateway and a second hardware edge gateway; the first hardware edge gateway is configured for generating first service identification information for representing a target service in response to a data sharing request sent by a data recipient, wherein the target service is a service to which audio-video data requested by the data sharing request belongs;

performing obfuscation on the first service identification information according to a preset obfuscation algorithm to obtain a first obfuscation set; sending the first obfuscation set to the second hardware edge gateway; the second hardware edge gateway is configured for receiving original audio-video data sent by a data owner, performing identification on contents of the original audio-video data to obtain service identification information for representing a service to which the original audio-video data belongs, as second service identification information; encapsulating the original audio-video data and the second service identification information to obtain preprocessed audio-video data; performing obfuscation on the second service identification information according to the preset obfuscation algorithm to obtain a second obfuscation set; calculating intersection service identification information of the first obfuscation set and the second obfuscation set; determining audio-video data to which the intersection service identification information belongs, in the preprocessed audio-video data, as first intersection audio-video data, and sending the first intersection audio-video data to the first hardware edge gateway;

the first hardware edge gateway is further configured for performing encryption on identity information and permission information sent by the data recipient according to a preset encryption algorithm to obtain first encrypted information;

the second hardware edge gateway is further configured for performing identification on contents of the first intersection audio-video data, to obtain a service category for representing a service to which the first intersection audio-video data belongs as categorizing information and a service grade for representing the service to which the first intersection audio-video data belongs as grading information;

performing encryption on the categorizing information and the grading information according to the preset encryption algorithm to obtain second encrypted information;

sending the second encrypted information to the first hardware edge gateway;

the first hardware edge gateway is further configured for calculating intersection encrypted information of the first encrypted information and the second encrypted information;

determining audio-video data to which the intersection encrypted information belongs, in the first intersection audio-video data, as second intersection audio-video data, and sending the second intersection audio-video data to the data recipient, the second hardware edge gateway is further configured for acquiring an original packet format of the original audio-video data, performing security detection on the original packet format, and determining original audio-video data to which original packet format passing the security detection belongs, as audio-video data to be shared encapsulating the original audio-video data and the second service identification information, obtained according to the original audio-video data, to obtain the preprocessed audio-video data, comprises:

encapsulating the audio-video data to be shared and the second service identification information obtained according to the audio-video data to be shared to obtain the preprocessed audio-video data.

2. The system according to claim 1, wherein, the first hardware edge gateway is further configured for generating first attribute information for representing an attribute of a target object in response to the data sharing request sent by the data recipient, wherein the target object is an object to which the audio-video data requested by the data sharing request belongs;

performing obfuscation on the first attribute information according to the preset obfuscation algorithm to obtain a third obfuscation set; sending the third obfuscation set to the second hardware edge gateway;

the second hardware edge gateway is further configured for performing identification on the contents of the original audio-video data, to obtain attribute information for representing an attribute of each object in the original audio-video data as second attribute information;

performing obfuscation on the second attribute information according to the preset obfuscation algorithm to obtain a fourth obfuscation set;

calculating intersection attribute information of the third obfuscation set and the fourth obfuscation set;

determining the audio-video data to which the intersection service identification information belongs, in the preprocessed audio-video data, as the first intersection audio-video data, comprises:

determining audio-video data to which both the intersection service identification information and the intersection attribute information belong, in the preprocessed audio-video data, as the first intersection audio-video data.

3. The system according to claim 1, wherein, the system further comprises a platform-side device;

the platform-side device is configured for generating pre-request data based on a data request, and performing obfuscation on the pre-request data according to the preset obfuscation algorithm to obtain a fifth obfuscation set, wherein, the data request is configured to request historical data of an hardware edge gateway;

sending the fifth obfuscation set to the hardware edge gateway;

the hardware edge gateway is configured for acquiring the historical data and performing obfuscation on the historical data according to the preset obfuscation algorithm to obtain a sixth obfuscation set;

calculating intersection historical data of the fifth obfuscation set and the sixth obfuscation set, performing encryption on the intersection historical data to obtain encrypted historical data;

sending the encrypted historical data to the platform-side device;

the platform-side device is further configured for performing training by using the encrypted historical data to obtain a target data sharing model, and deploying the target data sharing model to the hardware edge gateway;

the obfuscation is performed on information in a manner comprising:

inputting information on which obfuscation needs to be performed into the target data sharing model for obfuscation.

4. A method for securely sharing audio-video data based on full anonymous privacy computation, which is applied to a first hardware edge gateway, comprising:

generating first service identification information for representing a target service in response to a data sharing request sent by a data recipient, wherein the target service is a service to which audio-video data requested by the data sharing request belongs;

performing obfuscation on the first service identification information according to a preset obfuscation algorithm to obtain a first obfuscation set;

sending the first obfuscation set to a second hardware edge gateway, enabling the second hardware edge gateway to calculate intersection service identification information of the first obfuscation set and the second obfuscation set, determine audio-video data to which the intersection service identification information belongs, in preprocessed audio-video data, as first intersection audio-video data, and send the first intersection audio-video data to the first hardware edge gateway, wherein, the second obfuscation set is obtained by the second hardware edge gateway performing obfuscation on second service identification information according to the preset obfuscation algorithm, the second service identification information is service identification information for representing a service to which original audio-video data belongs, which is obtained by the second hardware edge gateway performing identification contents of the original audio-video data, the original audio-video data is sent by a data owner to the second hardware edge gateway, and the preprocessed audio-video data is obtained by the second hardware edge gateway encapsulating the original audio-video data and the second service identification audio-video data to be shared and the second service identification information obtained according to the audio-video data to be shared, the audio-video data to be shared is obtained by the second hardware edge gateway acquiring an original packet format of the original audio-video data, performing security detection on the original packet format, and determining original audio-video data to which original packet format passing the security detection belongs, as the audio-video data to be shared performing encryption on identity information and permission information sent by the data recipient according to a preset encryption algorithm to obtain first encrypted information;

calculating intersection encrypted information of the first encrypted information and the second encrypted information, wherein, the second encrypted information is obtained by the second hardware edge gateway performing encryption on categorizing information and grading information according to the preset encryption algorithm, and the categorizing information is information of a service category for representing a service to which the first intersection audio-video data belongs and the grading information is information of a service grade for representing the service to which the first intersection audio-video data belongs, which both are obtained by the second hardware edge gateway per-
forming identification on contents of the first intersec-
tion audio-video data;

determining audio-video data to which the intersection
encrypted information belongs, in the first intersection
audio-video data, as second intersection audio-video
data, and sending the second intersection audio-video
data to the data recipient.

5. The method according to claim 4, wherein, the method
further comprises:

generating first attribute information for representing an
attribute of a target object in response to the data
sharing request sent by the data recipient, wherein the
target object is an object to which the audio-video data
requested by the data sharing request belongs;

performing obfuscation on the first attribute information
according to the preset obfuscation algorithm to obtain
a third obfuscation set;

sending the third obfuscation set to the second hardware
edge gateway, enabling the second hardware edge
gateway to calculate intersection attribute information
of the third obfuscation set and the fourth obfuscation
set, wherein, the fourth obfuscation set is obtained by
the second hardware edge gateway performing obfus-
cation on second attribute information according to the
preset obfuscation algorithm, and the second attribute
information is attribute information for representing an
attribute of each object in the original audio-video data,
which is obtained by the second hardware edge gate-
way performing identification on the contents of the
original audio-video data;

determining the audio-video data to which the intersection
service identification information belongs, in the pre-
processed audio-video data, as the first intersection
audio-video data, comprises:

determining audio-video data to which both the intersec-
tion service identification information and the intersec-
tion attribute information belong, in the preprocessed
audio-video data, as the first intersection audio-video
data.

6. An electronic device, comprising:

a memory, configured for storing a computer program;

a processor, configured for implementing the method
according to claim 4 when executing the computer
program stored in the memory.

7. A non-transitory computer-readable storage medium,
which stores a computer program therein, which when
executed by a processor, causes the processor to implement
the method according to claim 4.

8. An electronic device, comprising:

a memory, configured for storing a computer program;

a processor, configured for implementing the method
according to claim 5 when executing the computer
program stored in the memory.

9. A non-transitory computer-readable storage medium,
which stores a computer program therein, which when
executed by a processor, causes the processor to implement
the method according to claim 5.

10. A method for securely sharing audio-video data based
on full anonymous privacy computation, which is applied to
a second hardware edge gateway, the method comprises:

receiving a first obfuscation set sent by a first hardware
edge gateway, wherein, the first obfuscation set is
obtained by the first hardware edge gateway perform-
ing obfuscation on first service identification informa-
tion according to a preset obfuscation algorithm, the
first service identification information is service identification information for representing a target service,
which is generated by the first hardware edge gateway
in response to a data sharing request sent by a data
recipient, the target service is a service to which
audio-video data requested by the data sharing request
belongs;

receiving original audio-video data sent by a data owner,
performing identification on contents of the original
audio-video data to obtain service identification infor-
mation for representing a service to which the original
audio-video data belongs, as second service identifica-
tion information; encapsulating the original audio-
video data and the second service identification infor-
mation to obtain preprocessed audio-video data;
performing obfuscation on the second service identifi-
cation information according to the preset obfuscation
algorithm to obtain a second obfuscation set;

calculating intersection service identification information
of the first obfuscation set and the second obfuscation
set;

determining audio-video data to which the intersection
service identification information belongs, in the pre-
processed audio-video data, as first intersection audio-
video data, and sending the first intersection audio-
video data to the first hardware edge gateway;

performing identification on contents of the first intersec-
tion audio-video data, to obtain a service category for
representing a service to which the first intersection
audio-video data belongs as categorizing information
and a service grade for representing the service to
which the first intersection audio-video data belongs as
grading information;

performing encryption on the categorizing information
and the grading information according to the preset
encryption algorithm to obtain second encrypted infor-
mation;

sending the second encrypted information to the first
hardware edge gateway, enabling the first hardware
edge gateway to calculate intersection encrypted infor-
mation of first encrypted information and the second
encrypted information, determine audio-video data to
which the intersection encrypted information belongs,
in the first intersection audio-video data, as second
intersection audio-video data, and send the second
intersection audio-video data to the data recipient,
wherein, the first encrypted information is obtained by
the first hardware edge gateway performing encryption
on identity information and permission information
sent by the data recipient according to the preset
encryption algorithm, the method further comprises:

acquiring an original packet format of the original audio-
video data, performing security detection on the origi-
nal packet format, and determining original audio-
video data to which original packet format passing the
security detection belongs, as audio-video data to be
shared;

wherein encapsulating the original audio-video data and
the second service identification information to obtain
the preprocessed audio-video data, comprises:

encapsulating the audio-video data to be shared and the
second service identification information obtained
according to the audio-video data to be shared to obtain
the preprocessed audio-video data.

11. The method according to claim 10, wherein, the
method further comprises: receiving a third obfuscation set
sent by the first hardware edge gateway, wherein, the third
obfuscation set is obtained by the first hardware edge gateway performing obfuscation on first attribute information according to the preset obfuscation algorithm, the first attribute information is attribute information for representing an attribute of a target object, which is generated by the first hardware edge gateway in response to the data sharing request sent by the data recipient, the target object is an object to which the audio-video data requested by the data sharing request belongs;

performing identification on the contents of the original audio-video data, to obtain attribute information for representing an attribute of each object in the original audio-video data as second attribute information;

performing obfuscation on the second attribute information according to the preset obfuscation algorithm to obtain a fourth obfuscation set;

calculating intersection attribute information of the third obfuscation set and the fourth obfuscation set;

determining the audio-video data to which the intersection service identification information belongs, in the preprocessed audio-video data, as the first intersection audio-video data, comprises:

determining audio-video data to which both the intersection service identification information and the intersection attribute information belong, in the preprocessed audio-video data, as the first intersection audio-video data.

12. An electronic device, comprising:

a memory, configured for storing a computer program;

a processor, configured for implementing the method according to claim 10 when executing the computer program stored in the memory.

13. A non-transitory computer-readable storage medium, which stores a computer program therein, which when executed by a processor, causes the processor to implement the method according to claim 10.

14. An electronic device, comprising:

a memory, configured for storing a computer program;

a processor, configured for implementing the method according to claim 11 when executing the computer program stored in the memory.

15. A non-transitory computer-readable storage medium, which stores a computer program therein, which when executed by a processor, causes the processor to implement the method according to claim 11.

* * * * *